United States Patent
Tanaka et al.

(10) Patent No.: US 8,406,671 B2
(45) Date of Patent: Mar. 26, 2013

(54) IMAGE FORMING APPARATUS AND METHOD OF CONTROLLING MINIMUM HALFTONE DOT SIZE

(75) Inventors: Yasuyuki Tanaka, Ashigarakami-gun (JP); Michio Kikuchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 442 days.

(21) Appl. No.: 12/728,372

(22) Filed: Mar. 22, 2010

(65) Prior Publication Data

US 2011/0044711 A1 Feb. 24, 2011

(30) Foreign Application Priority Data

Aug. 24, 2009 (JP) ................... 2009-193135

(51) Int. Cl.
*G03G 15/20* (2006.01)
(52) U.S. Cl. .......................... 399/336; 399/67
(58) Field of Classification Search .............. 399/67, 399/336; 358/3.06
See application file for complete search history.

(56) References Cited

U.S. PATENT DOCUMENTS

| | | | |
|---|---|---|---|
| 5,436,710 A | 7/1995 | Uchiyama | |
| 6,416,914 B1 * | 7/2002 | Nakamura et al. | 430/31 |
| 7,254,363 B2 * | 8/2007 | Nakamura et al. | 399/336 |
| 2002/0075376 A1 | 6/2002 | McIlvaine et al. | |
| 2006/0256151 A1 | 11/2006 | Yamazaki | |

FOREIGN PATENT DOCUMENTS

| | | |
|---|---|---|
| JP | 06-301304 A | 10/1994 |
| JP | 2000-214628 A | 8/2000 |
| JP | 2000-221814 A | 8/2000 |
| JP | 2002-044445 A | 2/2002 |
| JP | 2002-108023 A | 4/2002 |
| JP | 2002-202686 A | 7/2002 |
| JP | 2006-289750 A | 10/2006 |

* cited by examiner

*Primary Examiner* — David Gray
*Assistant Examiner* — G. M. Hyder
(74) *Attorney, Agent, or Firm* — Sughrue Mion, PLLC

(57) ABSTRACT

An image forming apparatus includes a raster image data generating unit, a halftone image data generating unit, a size control unit, an image forming unit and a flash fixing unit. The raster image data generating unit generates raster image data of a plurality of color components from document data. The halftone image data generating unit generates halftone image data from the raster image data. The size control unit controls minimum halftone dot sizes of the halftone image data. The image forming unit forms color toner images to be fixed on a recording medium using color toners corresponding to the plurality of color components, based on the halftone image data whose minimum halftone dot sizes are controlled by the size control unit. The flash fixing unit emits flash light from a flash light source to the recording medium to fix the color toner images transferred onto the recording medium.

9 Claims, 24 Drawing Sheets

FIG. 7

(A)
SCREEN MATRIX
(GROWTH ORDER)

| 34 | 26 | 18 | 21 | 29 | 33 |
|----|----|----|----|----|----|
| 30 | 14 | 6  | 9  | 13 | 25 |
| 22 | 10 | 2  | 1  | 5  | 17 |
| 19 | 7  | 3  | 4  | 12 | 24 |
| 27 | 15 | 11 | 8  | 16 | 32 |
| 35 | 31 | 23 | 20 | 28 | 36 |

(B)
SCREEN MATRIX
(THRESHOLD VALUE)

| 237 | 181 | 124 | 146 | 202 | 230 |
|-----|-----|-----|-----|-----|-----|
| 209 | 96  | 40  | 61  | 89  | 174 |
| 153 | 68  | 12  | 5   | 33  | 117 |
| 132 | 47  | 19  | 26  | 82  | 167 |
| 188 | 103 | 75  | 54  | 110 | 223 |
| 244 | 216 | 160 | 139 | 195 | 251 |

(A) SCREEN MATRIX (GROWTH ORDER)

| 36 | 28 | 20 | 22 | 31 | 35 | 36 | 28 | 20 | 22 | 31 | 35 |
|----|----|----|----|----|----|----|----|----|----|----|----|
| 32 | 16 | 8  | 11 | 15 | 27 | 32 | 16 | 8  | 11 | 15 | 27 |
| 23 | 12 | 4  | 3  | 7  | 19 | 23 | 12 | 4  | 3  | 7  | 19 |
| 17 | 5  | 1  | 2  | 10 | 21 | 17 | 5  | 2  | 2  | 10 | 21 |
| 25 | 13 | 9  | 6  | 14 | 30 | 25 | 13 | 9  | 6  | 14 | 30 |
| 33 | 29 | 24 | 18 | 26 | 34 | 33 | 29 | 24 | 18 | 26 | 34 |

(B) SCREEN MATRIX (THRESHOLD VALUE)

| 251 | 195 | 139 | 153 | 216 | 244 | 251 | 195 | 139 | 153 | 216 | 244 |
|-----|-----|-----|-----|-----|-----|-----|-----|-----|-----|-----|-----|
| 223 | 110 | 54  | 75  | 103 | 188 | 223 | 110 | 54  | 75  | 103 | 188 |
| 160 | 82  | 26  | 19  | 47  | 132 | 160 | 82  | 26  | 19  | 47  | 132 |
| 117 | 33  | 5   | 12  | 68  | 146 | 117 | 33  | 12  | 12  | 68  | 146 |
| 174 | 89  | 61  | 40  | 96  | 209 | 174 | 89  | 61  | 40  | 96  | 209 |
| 230 | 202 | 167 | 124 | 181 | 237 | 230 | 202 | 167 | 124 | 181 | 237 |

(A) SCREEN MATRIX (GROWTH ORDER)

(B) SCREEN MATRIX (THRESHOLD VALUE)

Sc3 (YSc)

FIG. 10

| 0 | 0 | 2 | 4 | 6 | 8 | 10 | 12 | 14 | 16 | 18 | 20 | 22 | 24 | 26 | 28 |
|---|---|---|---|---|---|---|---|---|---|---|---|---|---|---|---|
| 0 | 2 | 4 | 6 | 8 | 10 | 12 | 14 | 16 | 18 | 20 | 22 | 24 | 26 | 28 | 30 |
| 2 | 4 | 6 | 8 | 10 | 12 | 14 | 16 | 18 | 20 | 22 | 24 | 26 | 28 | 30 | 32 |
| 4 | 6 | 8 | 10 | 12 | 14 | 16 | 18 | 20 | 22 | 24 | 26 | 28 | 30 | 32 | 34 |
| 6 | 8 | 10 | 12 | 14 | 16 | 18 | 20 | 22 | 24 | 26 | 28 | 30 | 32 | 34 | 36 |
| 8 | 10 | 12 | 14 | 16 | 18 | 20 | 22 | 24 | 26 | 28 | 30 | 32 | 34 | 36 | 38 |
| 10 | 12 | 14 | 16 | 18 | 20 | 22 | 24 | 26 | 28 | 30 | 32 | 34 | 36 | 38 | 40 |
| 12 | 14 | 16 | 18 | 20 | 22 | 24 | 26 | 28 | 30 | 32 | 34 | 36 | 38 | 40 | 42 |
| 14 | 16 | 18 | 20 | 22 | 24 | 26 | 28 | 30 | 32 | 34 | 36 | 38 | 40 | 42 | 44 |
| 16 | 18 | 20 | 22 | 24 | 26 | 28 | 30 | 32 | 34 | 36 | 38 | 40 | 42 | 44 | 46 |
| 18 | 20 | 22 | 24 | 26 | 28 | 30 | 32 | 34 | 36 | 38 | 40 | 42 | 44 | 46 | 48 |
| 20 | 22 | 24 | 26 | 28 | 30 | 32 | 34 | 36 | 38 | 40 | 42 | 44 | 46 | 48 | 50 |
| 22 | 24 | 26 | 28 | 30 | 32 | 34 | 36 | 38 | 40 | 42 | 44 | 46 | 48 | 50 | 52 |
| 24 | 26 | 28 | 30 | 32 | 34 | 36 | 38 | 40 | 42 | 44 | 46 | 48 | 50 | 52 | 54 |
| 26 | 28 | 30 | 32 | 34 | 36 | 38 | 40 | 42 | 44 | 46 | 48 | 50 | 52 | 54 | 56 |
| 28 | 30 | 32 | 34 | 36 | 38 | 40 | 42 | 44 | 46 | 48 | 50 | 52 | 54 | 56 | 58 |
| 30 | 32 | 34 | 36 | 38 | 40 | 42 | 44 | 46 | 48 | 50 | 52 | 54 | 56 | 58 | 60 |
| 32 | 34 | 36 | 38 | 40 | 42 | 44 | 46 | 48 | 50 | 52 | 54 | 56 | 58 | 60 | 62 |
| 34 | 36 | 38 | 40 | 42 | 44 | 46 | 48 | 50 | 52 | 54 | 56 | 58 | 60 | 62 | 64 |
| 36 | 38 | 40 | 42 | 44 | 46 | 48 | 50 | 52 | 54 | 56 | 58 | 60 | 62 | 64 | 66 |
| 38 | 40 | 42 | 44 | 46 | 48 | 50 | 52 | 54 | 56 | 58 | 60 | 62 | 64 | 66 | 68 |
| 40 | 42 | 44 | 46 | 48 | 50 | 52 | 54 | 56 | 58 | 60 | 62 | 64 | 66 | 68 | 70 |

D1: INPUT IMAGE DATA

FIG. 11

|237|181|124|146|202|230|237|181|124|146|202|230|237|181|124|146|202|230|237|181|124|146|
|---|---|---|---|---|---|---|---|---|---|---|---|---|---|---|---|---|---|---|---|---|---|
|209|96|40|61|89|174|209|96|40|61|89|174|209|96|40|61|89|174|209|96|40|61|
|153|68|12|5|33|117|153|68|12|5|33|117|153|68|12|5|33|117|153|68|12|5|
|132|47|19|26|82|167|132|47|19|26|82|167|132|47|19|26|82|167|132|47|19|26|
|188|103|75|54|110|223|188|103|75|54|110|223|188|103|75|54|110|223|188|103|75|54|
|244|216|160|139|195|251|244|216|160|139|195|251|244|216|160|139|195|251|244|216|160|139|
|237|181|124|146|202|230|237|181|124|146|202|230|237|181|124|146|202|230|237|181|124|146|
|209|96|40|61|89|174|209|96|40|61|89|174|209|96|40|61|89|174|209|96|40|61|
|153|68|12|5|33|117|153|68|12|5|33|117|153|68|12|5|33|117|153|68|12|5|
|132|47|19|26|82|167|132|47|19|26|82|167|132|47|19|26|82|167|132|47|19|26|
|188|103|75|54|110|223|188|103|75|54|110|223|188|103|75|54|110|223|188|103|75|54|
|244|216|160|139|195|251|244|216|160|139|195|251|244|216|160|139|195|251|244|216|160|139|
|237|181|124|146|202|230|237|181|124|146|202|230|237|181|124|146|202|230|237|181|124|146|
|209|96|40|61|89|174|209|96|40|61|89|174|209|96|40|61|89|174|209|96|40|61|
|153|68|12|5|33|117|153|68|12|5|33|117|153|68|12|5|33|117|153|68|12|5|
|132|47|19|26|82|167|132|47|19|26|82|167|132|47|19|26|82|167|132|47|19|26|

Sc1

D1y

|0|0|2|4|6|8|10|12|14|16|18|20|22|24|26|28|30|32|34|36|38|40|
|---|---|---|---|---|---|---|---|---|---|---|---|---|---|---|---|---|---|---|---|---|---|
|0|2|4|6|8|10|12|14|16|18|20|22|24|26|28|30|32|34|36|38|40|42|
|2|4|6|8|10|12|14|16|18|20|22|24|26|28|30|32|34|36|38|40|42|44|
|4|6|8|10|12|14|16|18|20|22|24|26|28|30|32|34|36|38|40|42|44|46|
|6|8|10|12|14|16|18|20|22|24|26|28|30|32|34|36|38|40|42|44|46|48|
|8|10|12|14|16|18|20|22|24|26|28|30|32|34|36|38|40|42|44|46|48|50|
|10|12|14|16|18|20|22|24|26|28|30|32|34|36|38|40|42|44|46|48|50|52|
|12|14|16|18|20|22|24|26|28|30|32|34|36|38|40|42|44|46|48|50|52|54|
|14|16|18|20|22|24|26|28|30|32|34|36|38|40|42|44|46|48|50|52|54|56|
|16|18|20|22|24|26|28|30|32|34|36|38|40|42|44|46|48|50|52|54|56|58|
|18|20|22|24|26|28|30|32|34|36|38|40|42|44|46|48|50|52|54|56|58|60|
|20|22|24|26|28|30|32|34|36|38|40|42|44|46|48|50|52|54|56|58|60|62|
|22|24|26|28|30|32|34|36|38|40|42|44|46|48|50|52|54|56|58|60|62|64|
|24|26|28|30|32|34|36|38|40|42|44|46|48|50|52|54|56|58|60|62|64|66|
|26|28|30|32|34|36|38|40|42|44|46|48|50|52|54|56|58|60|62|64|66|68|
|28|30|32|34|36|38|40|42|44|46|48|50|52|54|56|58|60|62|64|66|68|70|

| 251 | 195 | 139 | 153 | 216 | 244 | 251 | 195 | 139 | 153 | 216 | 244 | 251 | 195 | 139 | 153 | 216 | 244 | 251 | 195 | 139 | 153 |
|---|---|---|---|---|---|---|---|---|---|---|---|---|---|---|---|---|---|---|---|---|---|
| 223 | 110 | 54 | 75 | 103 | 188 | 223 | 110 | 54 | 75 | 103 | 188 | 223 | 110 | 54 | 75 | 103 | 188 | 223 | 110 | 54 | 75 |
| 160 | 82 | 26 | 19 | 47 | 132 | 160 | 82 | 26 | 19 | 47 | 132 | 160 | 82 | 26 | 19 | 47 | 132 | 160 | 82 | 26 | 19 |
| 117 | 33 | 5 | 5 | 68 | 146 | 117 | 33 | 12 | 12 | 68 | 146 | 117 | 33 | 5 | 5 | 68 | 146 | 117 | 33 | 12 | 12 |
| 174 | 89 | 61 | 40 | 96 | 209 | 174 | 89 | 61 | 40 | 96 | 209 | 174 | 89 | 61 | 40 | 96 | 209 | 174 | 89 | 61 | 40 |
| 230 | 202 | 167 | 124 | 181 | 237 | 230 | 202 | 167 | 124 | 181 | 237 | 230 | 202 | 167 | 124 | 181 | 237 | 230 | 202 | 167 | 124 |
| 251 | 195 | 139 | 153 | 216 | 244 | 251 | 195 | 139 | 153 | 216 | 244 | 251 | 195 | 139 | 153 | 216 | 244 | 251 | 195 | 139 | 153 |
| 223 | 110 | 54 | 75 | 103 | 188 | 223 | 110 | 54 | 75 | 103 | 188 | 223 | 110 | 54 | 75 | 103 | 188 | 223 | 110 | 54 | 75 |
| 160 | 82 | 26 | 19 | 47 | 132 | 160 | 82 | 26 | 19 | 47 | 132 | 160 | 82 | 26 | 19 | 47 | 132 | 160 | 82 | 26 | 19 |
| 117 | 33 | 12 | 12 | 68 | 146 | 117 | 33 | 5 | 5 | 68 | 146 | 117 | 33 | 12 | 12 | 68 | 146 | 117 | 33 | 5 | 5 |
| 174 | 89 | 61 | 40 | 96 | 209 | 174 | 89 | 61 | 40 | 96 | 209 | 174 | 89 | 61 | 40 | 96 | 209 | 174 | 89 | 61 | 40 |
| 230 | 202 | 167 | 124 | 181 | 237 | 230 | 202 | 167 | 124 | 181 | 237 | 230 | 202 | 167 | 124 | 181 | 237 | 230 | 202 | 167 | 124 |
| 251 | 195 | 139 | 153 | 216 | 244 | 251 | 195 | 139 | 153 | 216 | 244 | 251 | 195 | 139 | 153 | 216 | 244 | 251 | 195 | 139 | 153 |
| 223 | 110 | 54 | 75 | 103 | 188 | 223 | 110 | 54 | 75 | 103 | 188 | 223 | 110 | 54 | 75 | 103 | 188 | 223 | 110 | 54 | 75 |
| 160 | 82 | 26 | 19 | 47 | 132 | 160 | 82 | 26 | 19 | 47 | 132 | 160 | 82 | 26 | 19 | 47 | 132 | 160 | 82 | 26 | 19 |
| 117 | 33 | 5 | 5 | 68 | 146 | 117 | 33 | 12 | 12 | 68 | 146 | 117 | 33 | 5 | 5 | 68 | 146 | 117 | 33 | 12 | 12 |

Sc2 (left label points to row 8); D1y (left label points to bottom table)

| 0 | 0 | 2 | 4 | 6 | 8 | 10 | 12 | 14 | 16 | 18 | 20 | 22 | 24 | 26 | 28 | 30 | 32 | 34 | 36 | 38 | 40 |
|---|---|---|---|---|---|---|---|---|---|---|---|---|---|---|---|---|---|---|---|---|---|
| 0 | 2 | 4 | 6 | 8 | 10 | 12 | 14 | 16 | 18 | 20 | 22 | 24 | 26 | 28 | 30 | 32 | 34 | 36 | 38 | 40 | 42 |
| 2 | 4 | 6 | 8 | 10 | 12 | 14 | 16 | 18 | 20 | 22 | 24 | 26 | 28 | 30 | 32 | 34 | 36 | 38 | 40 | 42 | 44 |
| 4 | 6 | 8 | 10 | 12 | 14 | 16 | 18 | 20 | 22 | 24 | 26 | 28 | 30 | 32 | 34 | 36 | 38 | 40 | 42 | 44 | 46 |
| 6 | 8 | 10 | 12 | 14 | 16 | 18 | 20 | 22 | 24 | 26 | 28 | 30 | 32 | 34 | 36 | 38 | 40 | 42 | 44 | 46 | 48 |
| 8 | 10 | 12 | 14 | 16 | 18 | 20 | 22 | 24 | 26 | 28 | 30 | 32 | 34 | 36 | 38 | 40 | 42 | 44 | 46 | 48 | 50 |
| 10 | 12 | 14 | 16 | 18 | 20 | 22 | 24 | 26 | 28 | 30 | 32 | 34 | 36 | 38 | 40 | 42 | 44 | 46 | 48 | 50 | 52 |
| 12 | 14 | 16 | 18 | 20 | 22 | 24 | 26 | 28 | 30 | 32 | 34 | 36 | 38 | 40 | 42 | 44 | 46 | 48 | 50 | 52 | 54 |
| 14 | 16 | 18 | 20 | 22 | 24 | 26 | 28 | 30 | 32 | 34 | 36 | 38 | 40 | 42 | 44 | 46 | 48 | 50 | 52 | 54 | 56 |
| 16 | 18 | 20 | 22 | 24 | 26 | 28 | 30 | 32 | 34 | 36 | 38 | 40 | 42 | 44 | 46 | 48 | 50 | 52 | 54 | 56 | 58 |
| 18 | 20 | 22 | 24 | 26 | 28 | 30 | 32 | 34 | 36 | 38 | 40 | 42 | 44 | 46 | 48 | 50 | 52 | 54 | 56 | 58 | 60 |
| 20 | 22 | 24 | 26 | 28 | 30 | 32 | 34 | 36 | 38 | 40 | 42 | 44 | 46 | 48 | 50 | 52 | 54 | 56 | 58 | 60 | 62 |
| 22 | 24 | 26 | 28 | 30 | 32 | 34 | 36 | 38 | 40 | 42 | 44 | 46 | 48 | 50 | 52 | 54 | 56 | 58 | 60 | 62 | 64 |
| 24 | 26 | 28 | 30 | 32 | 34 | 36 | 38 | 40 | 42 | 44 | 46 | 48 | 50 | 52 | 54 | 56 | 58 | 60 | 62 | 64 | 66 |
| 26 | 28 | 30 | 32 | 34 | 36 | 38 | 40 | 42 | 44 | 46 | 48 | 50 | 52 | 54 | 56 | 58 | 60 | 62 | 64 | 66 | 68 |
| 28 | 30 | 32 | 34 | 36 | 38 | 40 | 42 | 44 | 46 | 48 | 50 | 52 | 54 | 56 | 58 | 60 | 62 | 64 | 66 | 68 | 70 |

FIG. 15

Sc3 (YSc) ↓     Sc3 (YSc) ↓

| 237 | 181 | 124 | 146 | 202 | 230 | 237 | 181 | 124 | 146 | 202 | 230 | 237 | 181 | 124 | 146 | 202 | 230 | 237 | 181 | 124 | 146 |
|---|---|---|---|---|---|---|---|---|---|---|---|---|---|---|---|---|---|---|---|---|---|
| 209 | 96 | 40 | 61 | 89 | 174 | 209 | 96 | 40 | 61 | 89 | 174 | 209 | 96 | 40 | 61 | 89 | 174 | 209 | 96 | 40 | 61 |
| 153 | 68 | 19 | 19 | 33 | 117 | 153 | 68 | 5 | 5 | 33 | 117 | 153 | 68 | 19 | 19 | 33 | 117 | 153 | 68 | 5 | 5 |
| 132 | 47 | 19 | 19 | 82 | 167 | 132 | 47 | 5 | 5 | 82 | 167 | 132 | 47 | 19 | 19 | 82 | 167 | 132 | 47 | 5 | 5 |
| 188 | 103 | 75 | 54 | 110 | 223 | 188 | 103 | 75 | 54 | 110 | 223 | 188 | 103 | 75 | 54 | 110 | 223 | 188 | 103 | 75 | 54 |
| 244 | 216 | 160 | 139 | 195 | 251 | 244 | 216 | 160 | 139 | 195 | 251 | 244 | 216 | 160 | 139 | 195 | 251 | 244 | 216 | 160 | 139 |
| 237 | 181 | 124 | 146 | 202 | 230 | 237 | 181 | 124 | 146 | 202 | 230 | 237 | 181 | 124 | 146 | 202 | 230 | 237 | 181 | 124 | 146 |
| 209 | 96 | 40 | 61 | 89 | 174 | 209 | 96 | 40 | 61 | 89 | 174 | 209 | 96 | 40 | 61 | 89 | 174 | 209 | 96 | 40 | 61 |
| 153 | 68 | 12 | 12 | 33 | 117 | 153 | 68 | 26 | 26 | 33 | 117 | 153 | 68 | 12 | 12 | 33 | 117 | 153 | 68 | 26 | 26 |
| 132 | 47 | 12 | 12 | 82 | 167 | 132 | 47 | 26 | 26 | 82 | 167 | 132 | 47 | 12 | 12 | 82 | 167 | 132 | 47 | 26 | 26 |
| 188 | 103 | 75 | 54 | 110 | 223 | 188 | 103 | 75 | 54 | 110 | 223 | 188 | 103 | 75 | 54 | 110 | 223 | 188 | 103 | 75 | 54 |
| 244 | 216 | 160 | 139 | 195 | 251 | 244 | 216 | 160 | 139 | 195 | 251 | 244 | 216 | 160 | 139 | 195 | 251 | 244 | 216 | 160 | 139 |
| 237 | 181 | 124 | 146 | 202 | 230 | 237 | 181 | 124 | 146 | 202 | 230 | 237 | 181 | 124 | 146 | 202 | 230 | 237 | 181 | 124 | 146 |
| 209 | 96 | 40 | 61 | 89 | 174 | 209 | 96 | 40 | 61 | 89 | 174 | 209 | 96 | 40 | 61 | 89 | 174 | 209 | 96 | 40 | 61 |
| 153 | 68 | 19 | 19 | 33 | 117 | 153 | 68 | 5 | 5 | 33 | 117 | 153 | 68 | 19 | 19 | 33 | 117 | 153 | 68 | 5 | 5 |
| 132 | 47 | 19 | 19 | 82 | 167 | 132 | 47 | 5 | 5 | 82 | 167 | 132 | 47 | 19 | 19 | 82 | 167 | 132 | 47 | 5 | 5 |

Sc3 (YSc)

D1y →

| 0 | 0 | 2 | 4 | 6 | 8 | 10 | 12 | 14 | 16 | 18 | 20 | 22 | 24 | 26 | 28 | 30 | 32 | 34 | 36 | 38 | 40 |
|---|---|---|---|---|---|---|---|---|---|---|---|---|---|---|---|---|---|---|---|---|---|
| 0 | 2 | 4 | 6 | 8 | 10 | 12 | 14 | 16 | 18 | 20 | 22 | 24 | 26 | 28 | 30 | 32 | 34 | 36 | 38 | 40 | 42 |
| 2 | 4 | 6 | 8 | 10 | 12 | 14 | 16 | 18 | 20 | 22 | 24 | 26 | 28 | 30 | 32 | 34 | 36 | 38 | 40 | 42 | 44 |
| 4 | 6 | 8 | 10 | 12 | 14 | 16 | 18 | 20 | 22 | 24 | 26 | 28 | 30 | 32 | 34 | 36 | 38 | 40 | 42 | 44 | 46 |
| 6 | 8 | 10 | 12 | 14 | 16 | 18 | 20 | 22 | 24 | 26 | 28 | 30 | 32 | 34 | 36 | 38 | 40 | 42 | 44 | 46 | 48 |
| 8 | 10 | 12 | 14 | 16 | 18 | 20 | 22 | 24 | 26 | 28 | 30 | 32 | 34 | 36 | 38 | 40 | 42 | 44 | 46 | 48 | 50 |
| 10 | 12 | 14 | 16 | 18 | 20 | 22 | 24 | 26 | 28 | 30 | 32 | 34 | 36 | 38 | 40 | 42 | 44 | 46 | 48 | 50 | 52 |
| 12 | 14 | 16 | 18 | 20 | 22 | 24 | 26 | 28 | 30 | 32 | 34 | 36 | 38 | 40 | 42 | 44 | 46 | 48 | 50 | 52 | 54 |
| 14 | 16 | 18 | 20 | 22 | 24 | 26 | 28 | 30 | 32 | 34 | 36 | 38 | 40 | 42 | 44 | 46 | 48 | 50 | 52 | 54 | 56 |
| 16 | 18 | 20 | 22 | 24 | 26 | 28 | 30 | 32 | 34 | 36 | 38 | 40 | 42 | 44 | 46 | 48 | 50 | 52 | 54 | 56 | 58 |
| 18 | 20 | 22 | 24 | 26 | 28 | 30 | 32 | 34 | 36 | 38 | 40 | 42 | 44 | 46 | 48 | 50 | 52 | 54 | 56 | 58 | 60 |
| 20 | 22 | 24 | 26 | 28 | 30 | 32 | 34 | 36 | 38 | 40 | 42 | 44 | 46 | 48 | 50 | 52 | 54 | 56 | 58 | 60 | 62 |
| 22 | 24 | 26 | 28 | 30 | 32 | 34 | 36 | 38 | 40 | 42 | 44 | 46 | 48 | 50 | 52 | 54 | 56 | 58 | 60 | 62 | 64 |
| 24 | 26 | 28 | 30 | 32 | 34 | 36 | 38 | 40 | 42 | 44 | 46 | 48 | 50 | 52 | 54 | 56 | 58 | 60 | 62 | 64 | 66 |
| 26 | 28 | 30 | 32 | 34 | 36 | 38 | 40 | 42 | 44 | 46 | 48 | 50 | 52 | 54 | 56 | 58 | 60 | 62 | 64 | 66 | 68 |
| 28 | 30 | 32 | 34 | 36 | 38 | 40 | 42 | 44 | 46 | 48 | 50 | 52 | 54 | 56 | 58 | 60 | 62 | 64 | 66 | 68 | 70 |

HALFTONE PATTERN
ACCORDING TO INVENTION

HALFTONE PATTERN
ACCORDING TO RELATED ART

SCREEN WITH BLUE NOISE CHARACTERISTICS

HIGHLIGHT REGION

GENERAL SCREEN

Y SCREEN USED IN SECOND EMBODIMENT

Y SCREEN ACCORDING TO RELATED ART

IMAGE FORMING APPARATUS AND METHOD OF CONTROLLING MINIMUM HALFTONE DOT SIZE

CROSS-REFERENCE TO RELATED APPLICATION

This application is based on and claims priority under 35 USC119 from Japanese Patent Application No. 2009-193135 filed Aug. 24, 2009.

BACKGROUND

1. Technical Field

The present invention relates to an image forming apparatus, an image forming method and a computer readable medium.

2. Related Art

As a color image forming apparatus that is used in, for example, a printer or a multi-function printer, overlaps color toner images, transfers the color toner images onto a recording medium (sheet), melts and fixes the toner images to the sheet using a fixing device to form a color image, and discharges the sheet having the color image formed thereon, an image forming apparatus has been proposed which includes a flash fixing device that melts and fixes each color toner with flash light emitted from a light source lamp in order to prevent damage to the sheet due to a contact-type fixing device.

SUMMARY

According to an aspect of the invention, an image forming apparatus includes a raster image data generating unit, a halftone image data generating unit, a size control unit, an image forming unit and a flash fixing unit. The raster image data generating unit generates raster image data of a plurality of color components from document data to be printed. The halftone image data generating unit generates halftone image data from the minimum halftone dot sizes of the halftone image data corresponding to the plurality of color components when the halftone image data generating unit generates the halftone image data. The image forming unit forms color toner images to be fixed on a recording medium using color toners corresponding to the plurality of color components, based on the halftone image data whose minimum halftone dot sizes are controlled by the size control unit. The flash fixing unit emits flash light from a flash light source to the recording medium to fix the color toner images transferred onto the recording medium.

BRIEF DESCRIPTION OF THE DRAWINGS

Exemplary embodiments of the invention will be described in detail based on the following figures, wherein:

FIG. 7 is a diagram illustrating an example of a screen Sc1 used to convert a Y dot image;

FIG. 8 is a diagram illustrating an example of a screen Sc2 used to convert the Y dot image;

FIG. 9 is a diagram illustrating an example of a screen Sc3 used to convert the Y dot image in the first embodiment;

FIG. 10 is a conceptual diagram illustrating an example of the input image data of a halftone screening target;

FIG. 11 is a conceptual diagram illustrating a screen process performed on a Y component image using the screen Sc1;

FIG. 13 is a conceptual diagram illustrating the screen process performed on the Y component image using the screen Sc2;

FIG. 15 is a conceptual diagram illustrating the screen process using the screen Sc3 in the first embodiment;

DETAILED DESCRIPTION

Hereinafter, exemplary embodiments of the invention will be described in detail with reference to the accompanying drawings.

Figure 1:
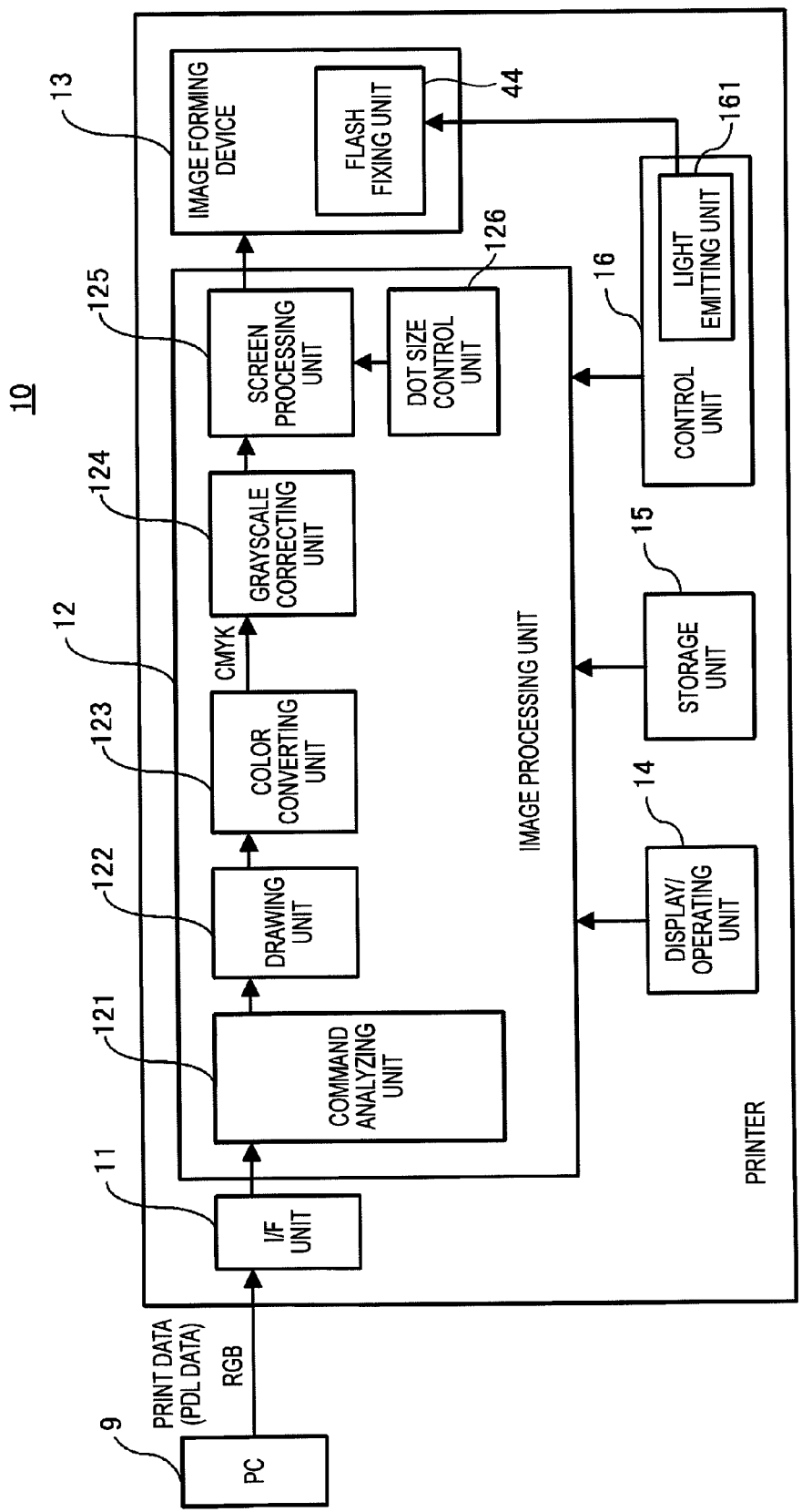
FIG. 1 is a block diagram illustrating the functional structure of a printer according to an embodiment of the invention.

FIG. 1 is a block diagram illustrating the functional structure of a printer 10 according to an embodiment of the invention.

The printer 10 includes, for example, an external interface (I/F) unit 11, serving as an interface for communication with an external apparatus, such as a client terminal (hereinafter, referred to as a PC) 9 implemented by a PC (personal computer), an image processing unit 12 that processes PDL (Page Description Language) data received from the PC 9 through the external I/F unit 11, an image forming device 13 that forms (prints) an image on a recording medium (a recording sheet: hereinafter, referred to as a sheet) on the basis of print data (halftone image data which will be described below)

obtained from the process result of the command by the image processing unit 12, a display/operating unit 14 including a display unit that displays various kinds of information, such as operation guidance and operation conditions, and an input unit, such as a keyboard or a mouse, a storage unit 15 that stores various kinds of information including, for example, operation programs, and a control unit 16 that controls the overall operation of the apparatus.

The image processing unit 12 includes: a PDL interpreter unit 121 that interprets PDL data input from the PC 9; a rendering unit 122 that performs a rendering process according to the PDL data, which is a printing target, to generate a raster image data; a color space converting unit 123 that transforms the color space (for example, RGB color space) of the raster image data generated from the PDL data into CMYK color space; a grayscale correcting unit 124 that corrects the grayscale tones of Y, M, C, and K each component in the CMYK raster image; a halftone screening unit 125 that performs a halftone screening process [which converts multi-grayscale pixels in the raster image data to binary pixels with a halftone screen (hereinafter, referred to as a screen) having a threshold matrix] on the raster image data whose grayscale is corrected by the grayscale correcting unit 124; and a dot size control unit 126 that controls the minimum size of dots in halftone image data to a size corresponding to each color component when the halftone screening unit 125 performs the screening process.

The image forming device 13 includes a flash fixing unit 44 that fixes each color toner image formed on a sheet to the sheet when an image is formed (printed) on the sheet on the basis of the print data (halftone image data) generated by the image processing unit 12.

Figure 2:
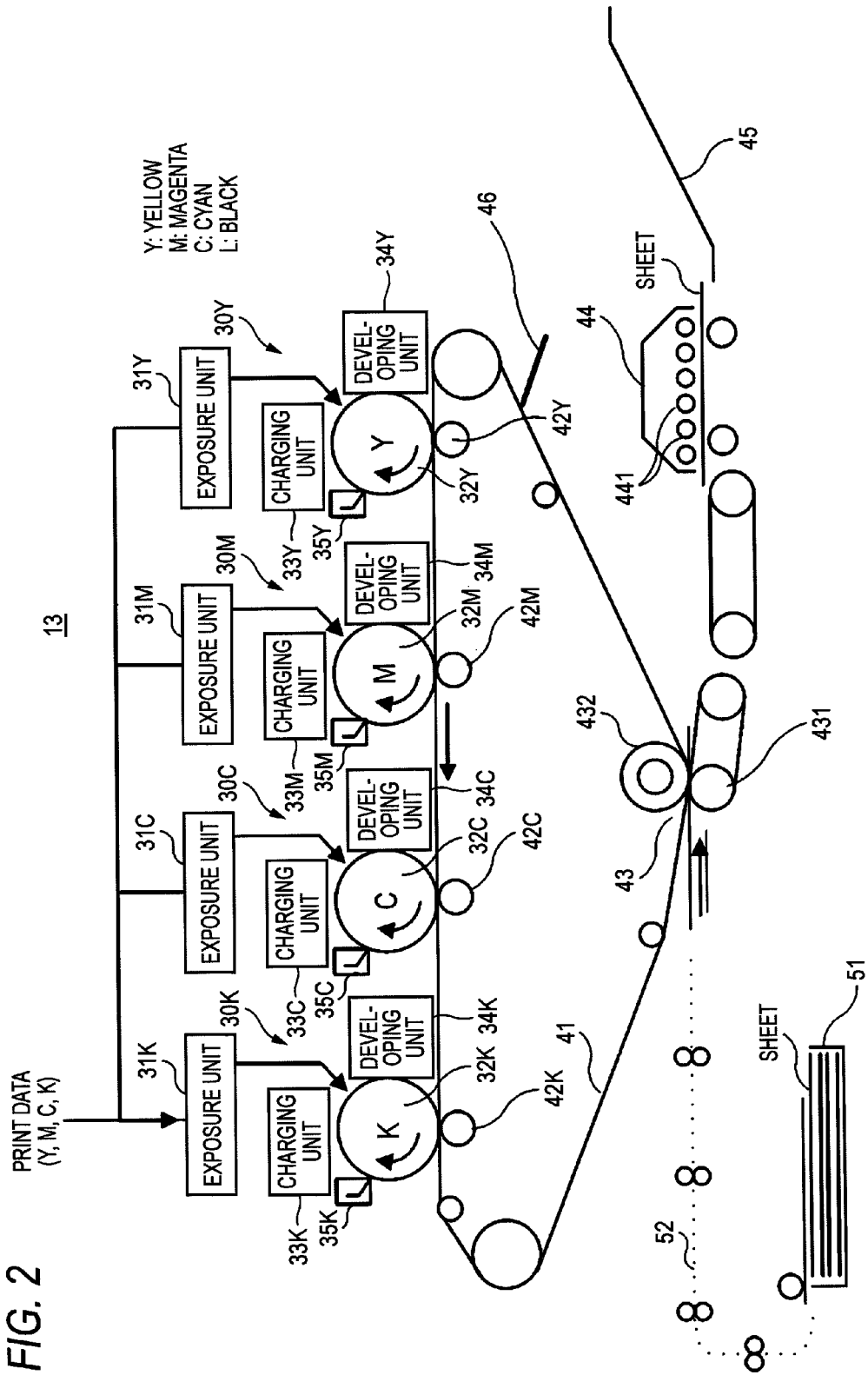
FIG. 2 is a diagram illustrating the structure of an image forming unit.

FIG. 2 shows the detailed structure of the image forming device 13. The image forming device 13 shown in FIG. 2 includes image forming units 30Y, 30M, 30C, and 30K that use, for example, yellow (Y), magenta (M), cyan (C), and black (K) toners (Y), (M), (C), and (K) to form Y, M, C, and K images (toner images), respectively.

The image forming units 30Y, 30M, 30C, and 30K respectively include: exposure units 31Y, 31M, 31C, and 31K that radiate laser beams to exposure images on the basis of image signals (print data: halftone image data) of color components (a Y component, an M component, a C component, and a K component) corresponding to each unit, which are input from the image processing unit 12; photoconductor drums 32Y, 32M, 32C, and 32K, which are image carriers on which electrostatic latent images corresponding to the image signals of the color components are formed by the image exposure; charging units 33Y, 33M, 33C, and 33K that charge the circumferential surfaces of the photoconductor drums 32Y, 32M, 32C, and 32K before the electrostatic latent images are formed; developing units 34Y, 34M, 34C, and 34K that are filled up with different color (Y, M, C, and K) toners and supply the corresponding color toners to the electrostatic latent images formed on the photoconductor drums 32Y, 32M, 32C, and 32K to form each color toner image; and drum cleaning units 35Y, 35M, 35C, and 35K that scrape away the toner remaining on the photoconductor drums 32Y, 32M, 32C, and 32K to clean the circumferential surfaces of the photoconductor drums 32Y, 32M, 32C, and 32K after each color toner image is transferred onto a transfer belt 41, which will be described below.

The image forming device 13 includes: an intermediate transfer belt (hereinafter, referred to as a transfer belt) 41 that sequentially performs multi-transfer (primary transfer) on the color toner images developed by the developing units 34Y, 34M, 34C, and 34K; belt transport rollers 42Y, 42M, 42C, and 42K that are provided so as to correspond to the photoconductor drums 32Y, 32M, 32C, and 32K of the image forming units 30Y, 30M, 30C, and 30K and transport the transfer belt 41 in the direction of an arrow; a transfer unit 43 that transfers (secondarily transfers) the color toner images that have been multi-transferred onto the transfer belt 41 transported by the belt transport rollers 42Y, 42M, 42C, and 42K onto the sheet transported from a sheet feed cassette 51 through a sheet transport path 52 using a belt transport roller 431 and a driven roller 432 that are rotated so as to come into pressure contact with each other; a flash fixing unit 44 through which the sheet having the color toner images transferred thereonto by the transfer unit 43 passes and fixes the color toner images to the sheet; a sheet discharge tray 45 that discharges the sheet having the color toner images fixed thereto by the flash fixing device 44; and a cleaning blade 46 that scrapes away the toner remaining on the transfer belt 41 after the transfer unit 43 transfers (secondarily transfers) the color toner images.

In the image forming device 13, the print data (halftone image data whose minimum dot size is controlled by the dot size control unit 126) output from the halftone screening unit 125 of the image processing unit 12 shown in FIG. 1 is input to the image forming units 30Y, 30M, 30C, and 30K corresponding to each color component.

The image forming units 30Y, 30M, 30C, and 30K perform an electrophotography process on the basis of the print data of the input color components to form color toner images on the photoconductor drums 32Y, 32M, 32C, and 32K, respectively. Then, the color toner images are overlapped on the transfer belt 41 that is transported in the direction of the arrow. When the transfer belt 41 reaches the transfer unit 43, the color toner images are transferred onto the sheet that is transported from the feed cassette 51 through the sheet transport path 52.

Then, the sheet having the color toner images transferred and formed thereon by the electrophotography process is transported so as to pass through the flash fixing device 44.

For example, the flash fixing unit 44 includes a xenon lamp 441 as a light source. The xenon lamp 441 is driven by a light-emitting unit 161 of the control unit 16 to emit light at a predetermined timing when the sheet having the color toner images multi-transferred thereonto passes through. The color toner images are melted and fixed to the sheet by flash light emitted from the xenon lamp 441.

The sheet having the color toner images fixed thereto by the flash light is transported and discharged to the sheet discharge tray 45.

Figure 3:
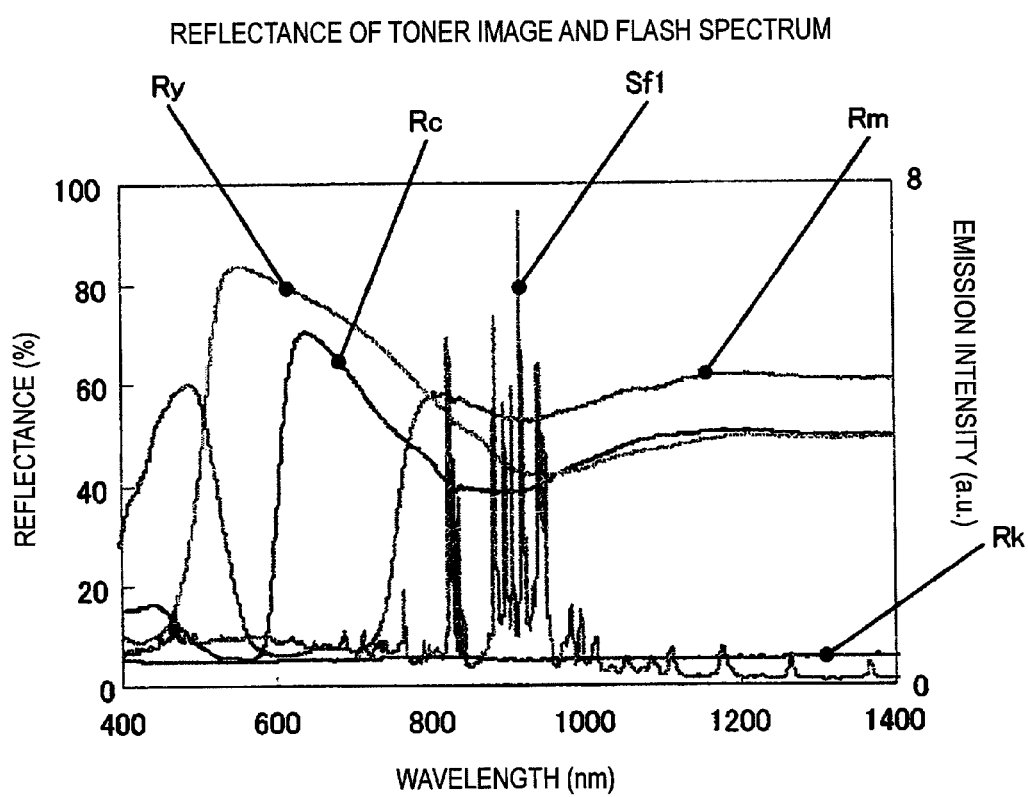
FIG. 3 is a diagram illustrating the distribution of a flash light spectrum and the distribution of the spectral reflectance of each toner image.

FIG. 3 is a diagram illustrating the distribution of the spectral wavelength (flash spectrum) of the emission intensity of the xenon lamp 441 that is used as a light source of the flash fixing unit 44 and the distribution of the spectral reflectivities (the percentage of light that is reflected without being absorbed at each wavelength) of Y, M, C, and K toner images with respect to light (flash light) emitted from the xenon lamp 441.

In FIG. 3, the flash spectrum of the xenon lamp 441 is distributed as represented by "Sf1".

The spectral reflectivities of the Y, M, C, and K toner images with respect to the flash light emitted from the xenon lamp 441 are represented by "Ry", "Rm", "Rc", and "Rk", respectively.

Figure 4:
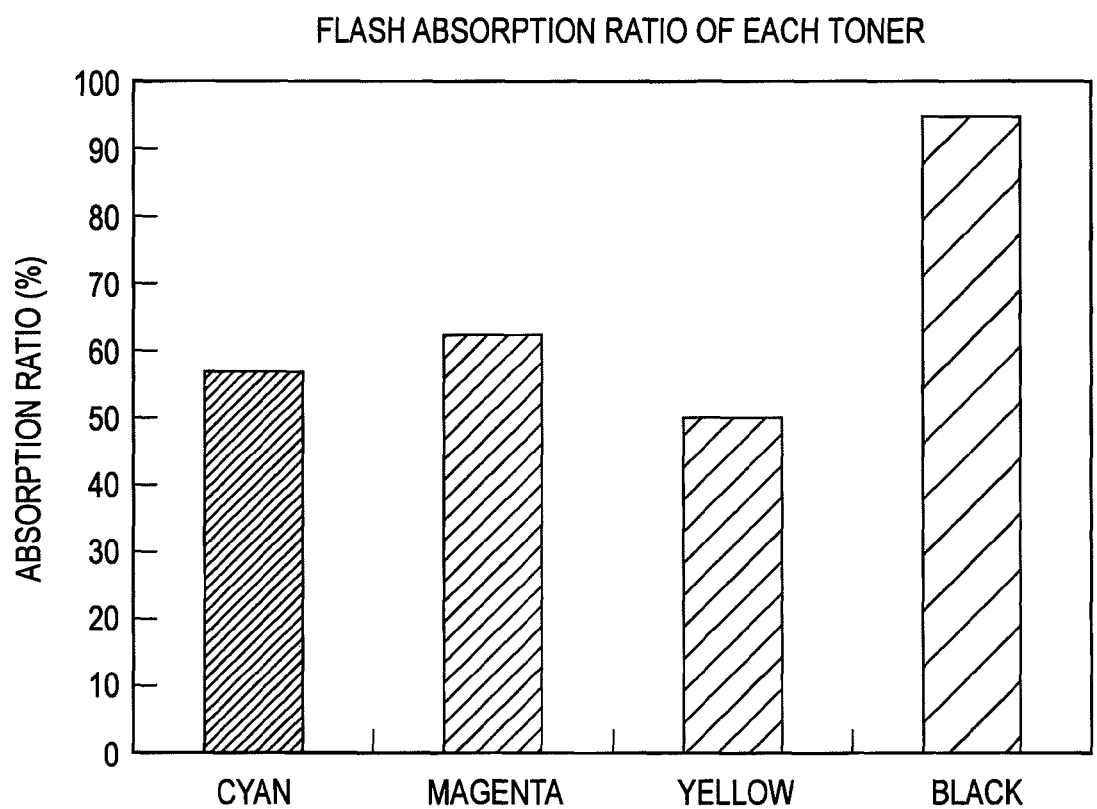
FIG. 4 is a diagram illustrating the flash absorption ratio characteristics of each color toner.

Therefore, among the light absorption ratios of the Y, M, C, and K toner images with respect to the flash light emitted from the xenon lamp 441, for example, the K (black) toner image has the highest absorption ratio, followed by the M (magenta)

toner image, the C (cyan) toner image, and the Y (yellow) toner image in this order, as the characteristics thereof are shown in FIG. 4.

In the example shown in FIG. 4, when the flash absorption ratio of the K toner image is greater than 90 percent, the flash absorption ratios of the M and C toner images are 60 percent and the flash absorption ratio of the Y toner image is 50 percent.

When a flash fixing process performed on each color toner image that is formed on the sheet on the basis of the halftone image data generated by the halftone screening unit 125 is considered, an increase in temperature with respect to the flash absorption ratios (see FIG. 4) of the Y, M, C, and K toner images is the largest in a region (a so-called solid region) in which halftone dots are spread without any gap therebetween and a area coverage ratio is 100 percent and is small in a low area coverage ratio region (a so-called highlight region) in which halftone dots are scattered.

The reason is that, in the highlight region in which the halftone dots are scattered (a area coverage ratio is less than a predetermined value), the diffusion of heat to the surrounding sheet is increased, as compared to an increase in the temperature of toner.

Therefore, under predetermined flash emission conditions, there is a large difference between the temperature of the K toner in the uniform region and the temperature of the Y toner in the highlight region, which is likely to cause a difference in fixing property.

In particular, the fixing property of the Y toner (see FIG. 4) with a flash absorption ratio less than those of other color toners in the highlight region deteriorates. When frictional force is applied to the surface, the toner is likely to be peeled off.

In this embodiment, in order to improve the above-mentioned things, in the screen process, the halftone dot size (hereinafter, referred to as a minimum dot size) of the Y toner with a low flash absorption ratio is relatively large when the grayscale starts to be reproduced. In this way, a difference in the flash fixing property of the Y toner in the highlight region is reduced.

Next, halftone image processing (halftone screening process) for improving the balance between the flash fixing properties of the color toner images according to embodiments will be described in detail.

A printer 10 according to a first embodiment has the functional structure shown in FIG. 1. The printer 10 performs a printing operation along the flowchart shown in FIG. 5.

Figure 5:
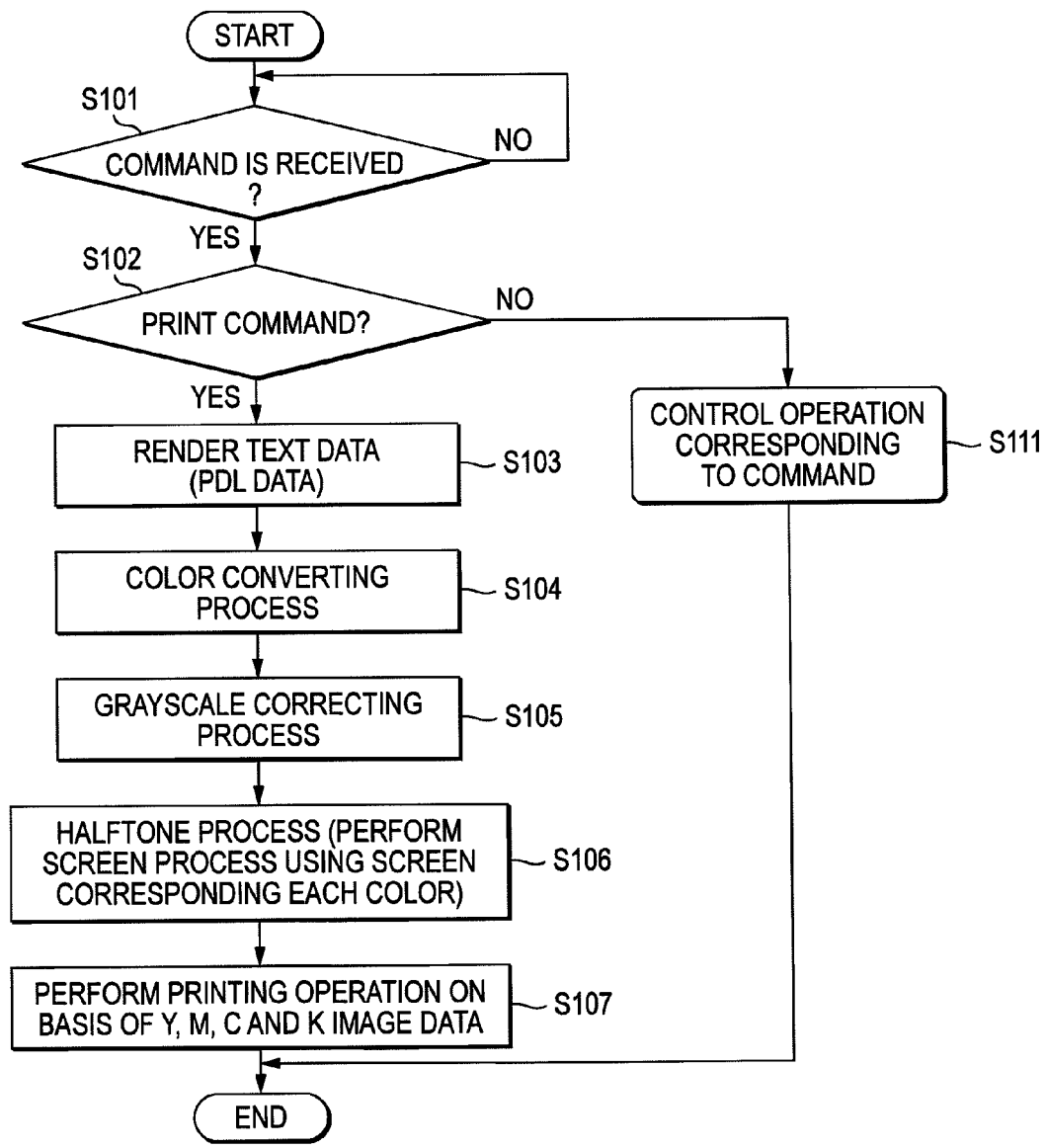
FIG. 5 is a flowchart illustrating a printing operation of the printer according to a first embodiment.

As shown in FIG. 5, in the printer 10, in a standby state, the PDL interpreter unit 121 monitors whether PDL data is received from the PC 9 (Step S101).

When a PDL data are received from the PC 9 (Step S101: YES), the PDL interpreter unit 121 interprets the PDL data and determines whether a print command is included (Step S102).

If it is determined that a print command is not included (Step S102: NO), the control of an operation corresponding to the PDL data starts (Step S111). When the operation is completed, the control of the operation ends.

On the other hand, if it is determined that a print command is included (Step S102: YES), a printing process (Steps S103 to S107) is performed according to the PDL data.

When the printing process is performed, first, the rendering unit 122 generates raster image data as the PDL data describe. The color space of the raster image depends on the PDL data (typically RGB color space) (Step S103).

Then, the color space converting unit 123 converts the color space of raster image data generated by rendering unit into CMYK color space (Step S104).

Then, the grayscale correcting unit 124 corrects the grayscale tone of the Y, M, C, and K component in CMYK color space raster image data converted by the color space converting unit 123 (Step S105), and the grayscale-corrected image data (raster image data) is input to the halftone screening unit 125.

The halftone screening unit 125 performs halftone screening process for converting the image data of the grayscale-corrected color components input from the grayscale correcting unit 124 into binarized halftone image data of each color component with the halftone screen (screen) (Step S106).

In this case, the halftone screening unit 125 converts the input image data of each color component into halftone image data with different minimum halftone dot sizes using the screens (different screens corresponding to each color) corresponding to the input image data of each color component selected by the dot size control unit 126, and transmits the halftone image data to the image forming device 13.

The image forming device 13 performs a printing operation on the basis of the Y, M, C, and K image data (halftone image data) transmitted from the halftone screening unit 125 (Step S107).

In the printing operation, as described above, the image forming units 30Y, 30M, 30C, and 30K perform an electrophotography process on the basis of the Y, M, C, and K halftone image data to multi-transfer the color toner images onto the sheet. When the sheet passes through the flash fixing unit 44, the xenon lamp 441 emits flash light to fix the color toner images to the sheet and the sheet is discharged.

During the halftone image (halftone) processing in Step S106, the halftone screening unit 125 uses the screens corresponding to each color component of the input image data selected by the dot size control unit 126, that is, a first screen corresponding to the K component, a second screen corresponding to the M component, a third screen corresponding to the C component, and a fourth screen corresponding to the Y component.

As can be seen from the fourth screen (see FIGS. 7 to 9) corresponding to the Y component, which will be described below, each of the first to fourth screens has a structure in which a dot growth order and a threshold value are allocated so as to correspond to the cells (pixels) in an N×M (N and M are arbitrary numbers) matrix.

In the halftone screening process, color screens corresponding to N×M input pixel (multi-grayscale pixel) regions of each color component (each color plate) of raster image data to be converted are sequentially provided. When the input pixel value (grayscale value) of each cell on the screen is greater than a threshold value of each cell, the grayscale value is converted into "1". When the input pixel value is not greater than the threshold value, the grayscale value is converted into "0".

Actually, each of the first to fourth screens is implemented by a lookup table (first to fourth tables in FIG. 6) that stores an address corresponding to each of the cells arranged in a matrix and stores a threshold value corresponding to each cell arranged at the address.

The halftone screening unit 125 performs a halftone screen process of acquiring an address corresponding to the position of each input pixel of the input image data, reading a threshold value from the address in the lookup table, comparing the input pixel value with the read threshold value, and outputting a binary signal "1" or "0" on the basis of the comparison result.

The halftone image (halftone) processing in Step S106 of FIG. 5 will be described in detail with reference to the flowchart shown in FIG. 6, in consideration of the above.

Figure 6:
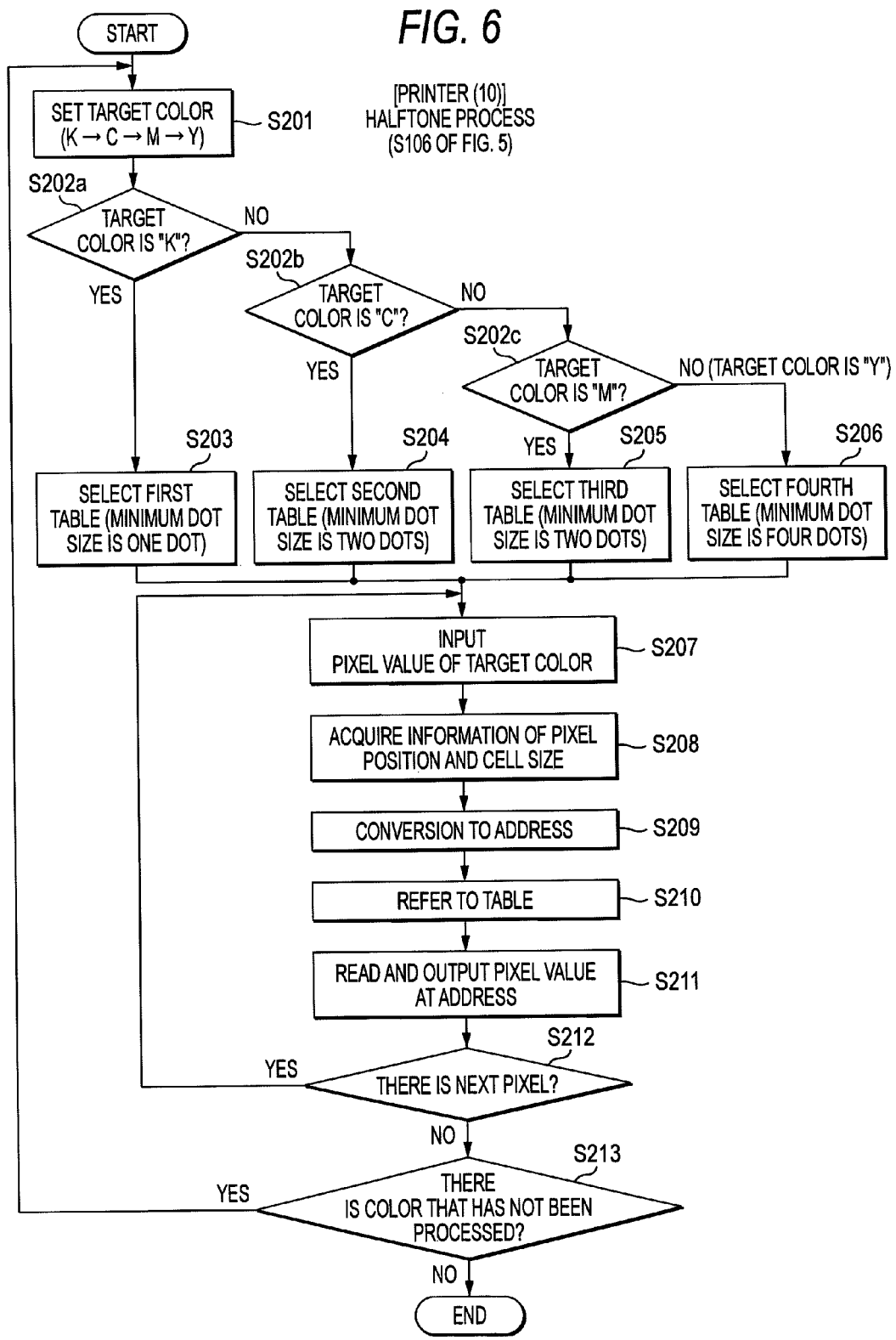
FIG. 6 is a flowchart illustrating a halftone image processing operation of the printer according to the first embodiment.

In FIG. 6, when the raster image data to be processed is input from the grayscale correcting unit 124, the halftone screening unit 125 sets "K" as a halftone screening process target according to the definition of the order in which K, C, M, and Y are changed, for example (Step S201).

Then, the dot size control unit 126 determines whether a target color is "K" (Step S202a). If it is determined that the target color is "K" (Step S202a: YES), the dot size control unit 126 selects a first table corresponding to "K" which has been prepared in advance (Step S203), and performs a halftone screening process after Step S207.

That is, after selecting the first table in Step S203, the halftone screening unit 125 acquires the pixel value of the first pixel in the input image (raster image) data of the target color "K" (Step S207), and acquires information, such as the position of the pixel and the size of a screen cell, from predetermined information (Step S208). Then, the halftone screening unit 125 generates the address of the first table on the basis of the acquired information and the acquired pixel value (input pixel value) (Step S209).

Then, the halftone screening unit 125 refers to the first table on the basis of the address (Step S210), reads an output pixel value corresponding to the address from the first table, compares the read output pixel value (threshold value) with the input pixel value, determines a binary output pixel value (halftone image data) on the basis of the comparison result, and outputs the binary output pixel value to the image forming device 13 (Step S211).

Then, the halftone screening unit 125 determines whether there is a next pixel (Step S212). If it is determined that there is a next pixel (Step S212: YES), the halftone screening unit 125 performs Steps S207 to S211 to determine a binary output pixel value (halftone image data) corresponding to the input pixel value using the first table, and outputs the binary output pixel value to the image forming device 13 (Step S211).

Steps S207 to S211 are continuously performed as long as there is the next pixel (Step S212: YES). If it is determined that there is no next pixel (Step S212: NO), the halftone screening unit 125 determines whether there is a color that has not been processed (Step S213). If it is determined that there is a color "C" that has not been processed (Step S213: YES), the halftone screening unit 125 sets the color "C" as a target color (Step S201).

If it is determined that the target color is "C" (Step S202b: YES), the halftone screening unit 125 selects the second table (Step S204) and performs Steps S207 to S212 to convert each input pixel value of the C component into a binary output pixel value using the second table.

When the conversion of all the input pixel values of the C component into binary output pixel values (halftone image data) is completed (Step S212: NO), it is determined that there is a color "M" that has not been processed (Step S213: YES), and the color "M" that has not been processed is set as a target color (Step S201).

If it is determined that the target color is "M" (Step S202c: YES), the halftone screening unit 125 selects the third table (Step S205) and performs Steps S207 to S212 to convert each input pixel value of the M component into a binary output pixel value using the third table.

When the conversion of all the input pixel values of the M component into binary output pixel values (halftone image data) is completed (Step S212: NO), it is determined that there is a color "Y" that has not been processed (Step S213: YES), and the color "Y" that has not been processed is set as a target color (Step S201).

If it is determined that the target color is "Y" (Step S202c: NO), the halftone screening unit 125 selects the fourth table (Step S206) and converts all input pixel values of the Y component into binary output pixel values using the fourth table (through Steps S207 to S212).

When the conversion of all the input pixel values of the Y component into binary output pixel values (halftone image data) is completed (Step S212: NO), it is determined that there is no color that has not been processed (Step S213: NO), and a series of halftone screening processes end.

Next, an example of the fourth screen used in the Y halftone screening process (corresponding to the fourth table shown in FIG. 6) will be described.

FIG. 7 is a diagram illustrating an example of a screen Sc1 capable of achieving halftone screening in which the minimum halftone dot size (the size of a hatched region in FIG. 7) of a highlight portion in the image data of the Y component is one pixel. In FIG. 7, threshold values corresponding to number 1 to number 36 in growth order set by a growth order matrix shown in part (A) of FIG. 7 are set by a threshold value matrix shown in part (B) of FIG. 7 so as to be associated with the growth order.

FIG. 8 is a diagram illustrating an example of a screen Sc2 capable of achieving halftone screening in which the minimum halftone dot size (the size of a hatched region in FIG. 8) of a highlight portion in the image data of the Y component is two pixels. In FIG. 8, threshold values corresponding to number 1 to number 36 in growth order (two sets of number 1 to number 36 in growth order) set by a growth order matrix shown in part (A) of FIG. 8 are set by a threshold value matrix shown in part (B) of FIG. 8 so as to be associated with the growth order.

FIG. 9 is a diagram illustrating an example of a screen Sc3 capable of achieving halftone screening in which the minimum halftone dot size (the size of a hatched region in FIG. 9) of a highlight portion in the image data of the Y component are four pixels. In FIG. 9, threshold values corresponding to number 1 to number 36 in growth order (four sets of number 1 to number 36 in growth order) set by a growth order matrix shown in part (A) of FIG. 9 are set by a threshold value matrix shown in part (B) of FIG. 9 so as to be associated with the growth order.

For example, a process when data D1y of the Y component in input image data D1 in which each pixel has a pixel value shown in FIG. 10 is converted into a Y halftone image by the screens Sc1, Sc2, and Sc3 is considered.

In this case, for example, when the screen Sc1 is selected for the data D1y of the Y component in the input image data D1, for example, the selected screen Sc1 is arranged on the data D1y of the Y component, as shown in FIG. 11.

In this case, the pixel value at the position of each cell in the data D1y is compared with the pixel value at the position of the corresponding cell on the screen Sc1. As a result of the comparison, as shown in FIG. 12, Y halftone image data D2y-1 is obtained.

Figure 12:
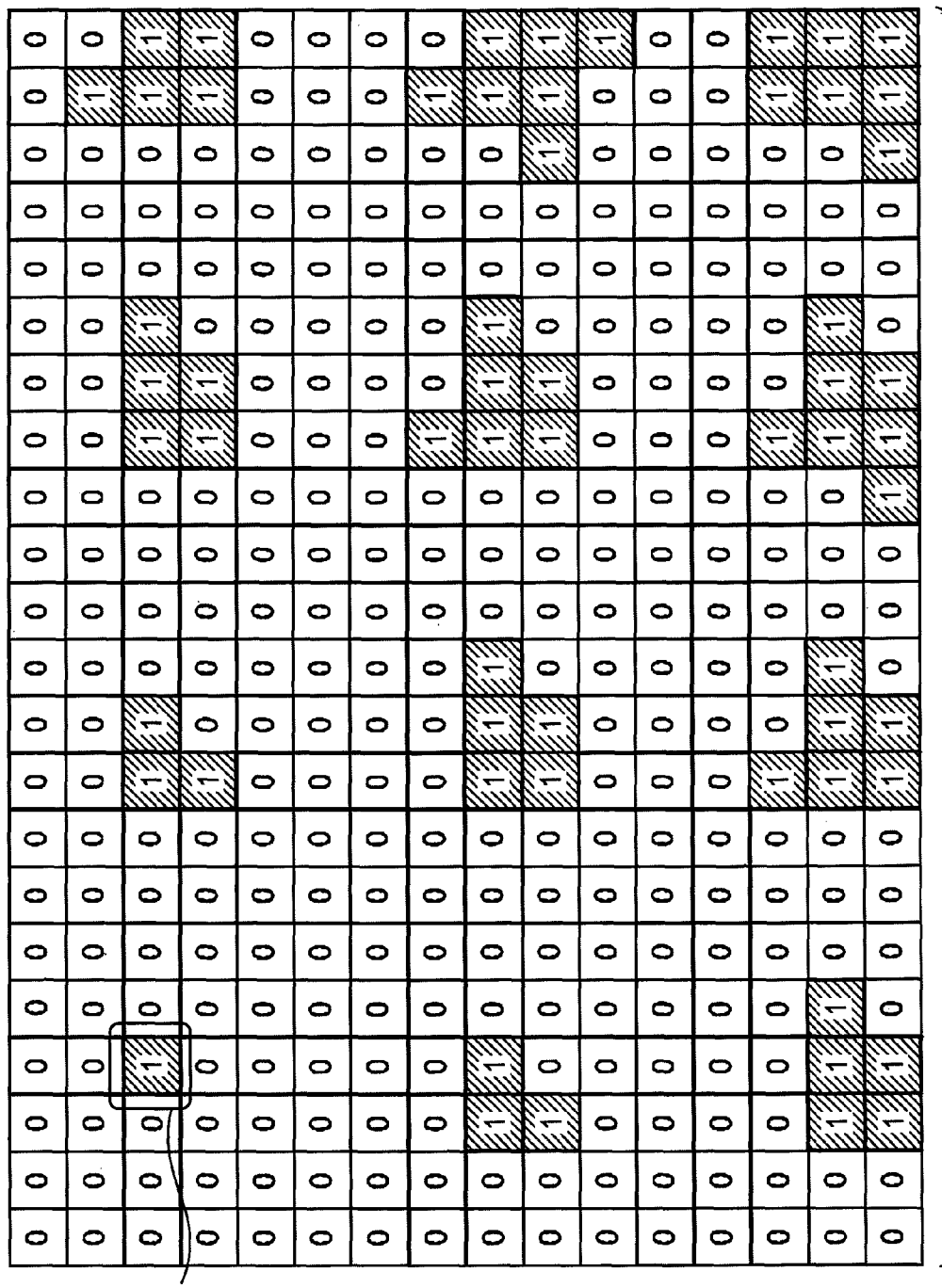
FIG. 12 is a conceptual diagram illustrating an example of the Y halftone image data obtained by the screen process shown in FIG. 11.

In FIG. 12, in the Y halftone image data D2y-1, a black dot with a pixel value "1" has an input pixel value greater than a threshold value at the corresponding cell position. In this example, the minimum halftone dot size is one pixel.

In this way, in the case of the input image data D1 with the pixel values shown in FIG. 10, when the halftone screening process is performed on the data D1y of the Y component using the screen Sc1, as shown in FIG. 12, similar to the printer according to the related art, it is possible to form a halftone image having one pixel as the minimum halftone dot size in the highlight region.

When the screen Sc2 is selected for the data D1y of the Y component in the input image data D1, for example, the selected screen Sc2 is arranged on the data D1y of the Y component, as shown in FIG. 13.

In this case, the pixel value at the position of each cell in the data D1y is compared with the pixel value at the position of the corresponding cell on the screen Sc2. As a result of the comparison, as shown in FIG. 14, Y halftone image data D2y-2 is obtained.

Figure 14:
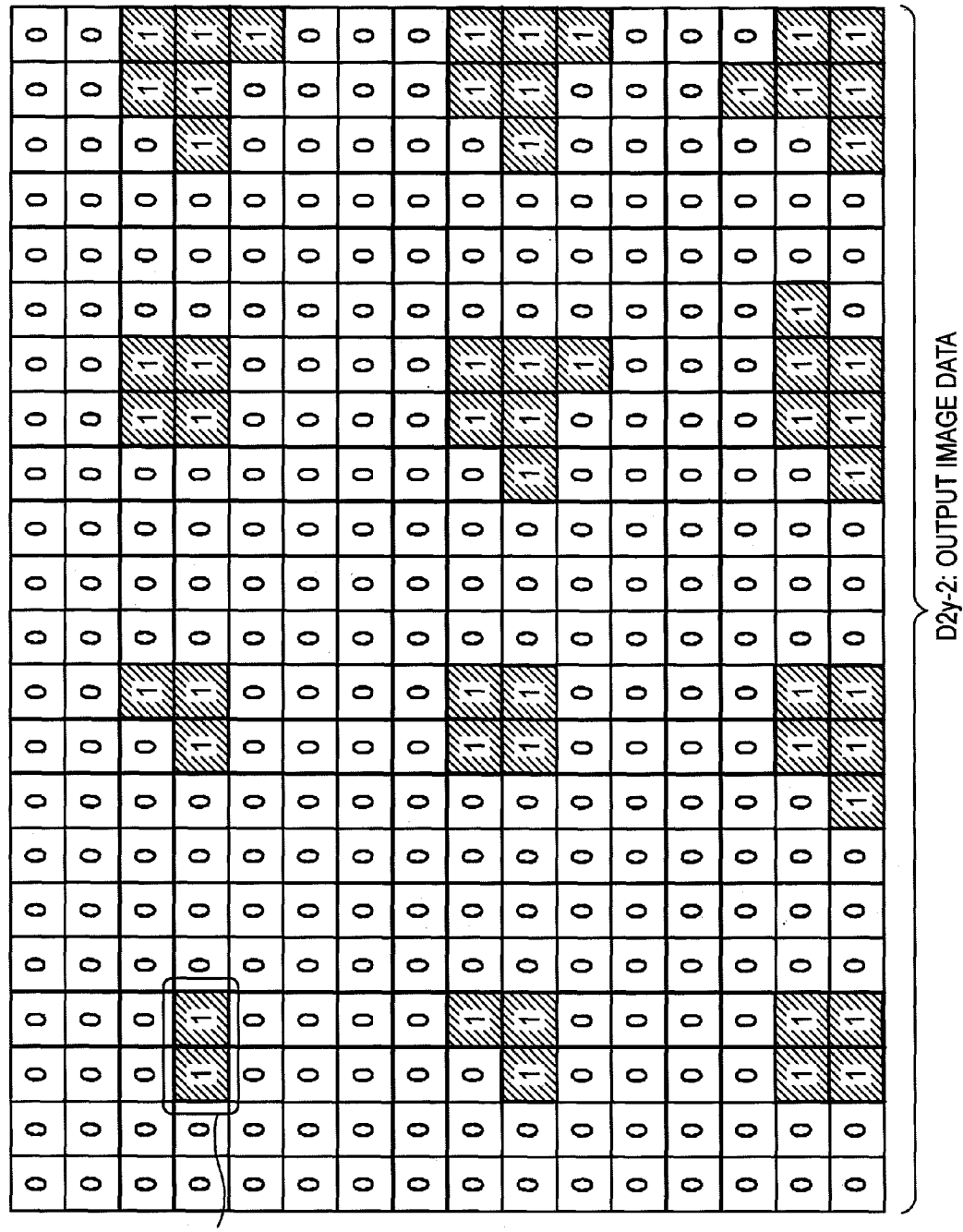
FIG. 14 is a conceptual diagram illustrating an example of the Y halftone image data obtained by the screen process shown in FIG. 13.

That is, in the case of the input image data D1 with the pixel values shown in FIG. 10, when the halftone screening process is performed on the data D1y of the Y component using the screen Sc2, as shown in FIG. 14, it is possible to form a halftone image having two pixels as the minimum halftone dot size in the highlight region.

When the screen Sc3 is selected for the data D1y of the Y component in the input image data D1, for example, the selected screen Sc3 is arranged on the data D1y of the Y component, as shown in FIG. 15.

In this case, the pixel value at the position of each cell in the data D1y is compared with the pixel value at the position of the corresponding cell on the screen Sc3. As a result of the comparison, as shown in FIG. 16, Y halftone image data D2y is obtained.

Figure 16:
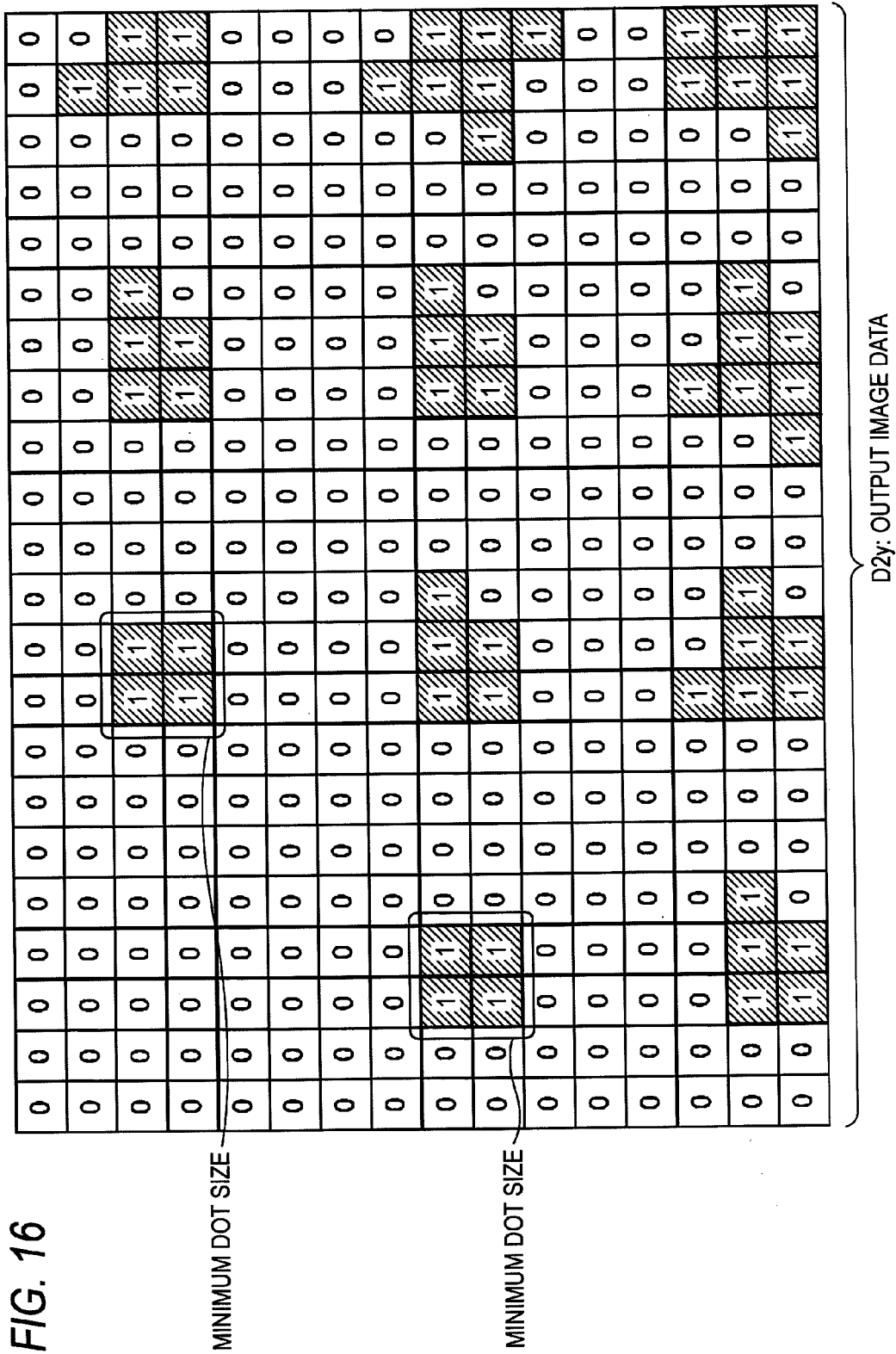
FIG. 16 is a conceptual diagram illustrating an example of the Y halftone image data obtained by the screen process shown in FIG. 15.

That is, in the case of the input image data D1 with the pixel values shown in FIG. 10, when the halftone screening process is performed on the data D1y of the Y component using the screen Sc3, as shown in FIG. 16, it is possible to form a halftone image having four pixels as the minimum halftone dot size in the highlight region.

In FIGS. 7 to 16, an example in which the screens Sc1, Sc2, and Sc3 are selectively applied to the image data D1y of the Y component to change the minimum halftone dot size in the Y dot image has been described.

In the actual operation of the printer 10 according to this embodiment, a screen Sc3 (hereinafter, referred to as a screen YSc) having the structure [the screen angle is, for example, "0 (zero)" degree] shown in FIG. 9 is used as a screen corresponding to the Y component (corresponding to the fourth table shown in FIG. 6).

On the other hand, the following screens having screen angles different from that of the screen YSc (see FIG. 9) corresponding to the Y component are used as the screens corresponding to the K, C, and M components (corresponding to the first to third screens shown in FIG. 6).

For example, a screen KSc that has a screen angle of 45 degrees and has one pixel as the minimum halftone dot size like the screen Sc1 shown in FIG. 7 (that is, a screen having an angel of 45 degrees with respect to the screen Sc1 corresponding to the Y component) is used as the screen corresponding to the K component.

In addition, a screen CSc that has a screen angle of, for example, 15 degrees and has two pixels as the minimum halftone dot size like the screen Sc2 shown in FIG. 8 (that is, a screen having an angel of 15 degrees with respect to the screen Sc2 corresponding to the Y component) is used as the screen corresponding to the C component.

Similarly, a screen MSc that has a screen angle of, for example, 75 degrees and has two pixies as the minimum halftone dot size like the screen Sc2 shown in FIG. 8 (that is, a screen having an angel of 75 degrees with respect to the screen Sc2 corresponding to the Y component) is used as the screen corresponding to the M component.

However, in this embodiment, for simplicity of description, the detailed structures of the screens KSc, CSc, and MSc are not shown (it is difficult to show the screens KSc, CSc, and MSc with screen angles different from the screen angle (0 degree) of the screen YSc since the cell size is large).

In order to selectively apply the screens corresponding to each color component, in the printer 10 according to this embodiment, for example, the screen KSc corresponding to the K component, the screen CSc corresponding to the C component, the screen MSc corresponding to the M component, and the screen YSc corresponding to the Y component are prepared in the halftone screening unit 125.

When the image data D1 (see FIG. 10) including each color component is input from the grayscale correcting unit 124, the dot size control unit 126 selects the screen YSc (corresponding to the screen Sc3 shown in FIG. 9) corresponding to the data D1y of the Y component, and the selected screen YSc is arranged on the data D1y of the Y component, for example, as shown in FIG. 15.

Then, the pixel value at the position of each cell in the data D1y of the Y component is compared with the pixel value at the position of the corresponding cell on the screen YSc. As a result of the comparison, halftone image data D2y of the Y component shown in FIG. 16 is obtained.

Figure 17A:
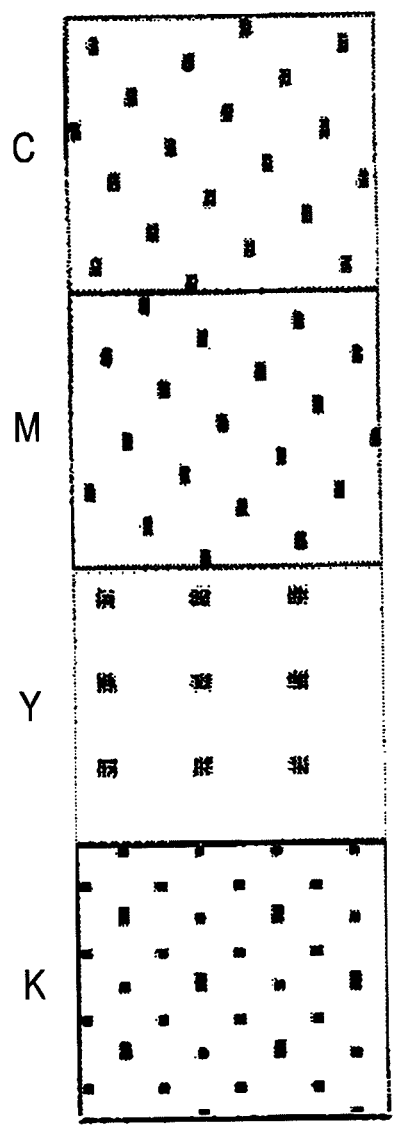
FIGS. 17A and 17B are diagrams illustrating the comparison between a halftone pattern according to the first embodiment and a pattern according to the related art.

That is, when the halftone screening process is performed on the data D1y of the Y component obtained by selecting and applying the screen YSc to the input image data (see FIG. 10), as shown in FIG. 16, it is possible to form a halftone image [see a Y halftone pattern shown in FIG. 17A] having four pixels as the minimum halftone dot size in the highlight region.

In contrast, the dot size control unit 126 selects the screen CSc for data D1c of the C component in the image data D1.

The halftone screening unit 125 arranges the selected screen CSc on the data D1c of the C component, compares the pixel value at the position of each cell in the data D1c of the C component with the pixel value at the position of the corresponding cell on the screen CSc, generates C halftone image data D2c with a value "1" or "0" on the basis of the comparison result, and outputs the C halftone image data D2c.

The dot size control unit 126 selects the screen MSc for data D1m of the M component in the image data D1.

The halftone screening unit 125 arranges the selected screen MSc on the data D1m of the M component, compares the pixel value at the position of each cell in the data D1m of the M component with the pixel value at the position of the corresponding cell on the screen MSc, generates M halftone image data D2m with a value "1" or "0" on the basis of the comparison result, and outputs the M halftone image data D2m.

As can be seen from the Y halftone image data D2y shown in FIG. 16, in the data D2c of the C component generated by using the screen CSc or the data D2m of the M component generated by using the screen MSc, a black pixel has an input pixel value that is greater than a threshold value at the corresponding cell position, and a white pixel has an input pixel value that is less than the threshold value at the corresponding cell position.

As described above, the screens CSc and MSc are obtained by inclining the screen Sc2 (see FIG. 8) corresponding to the Y component, which has two dots as the minimum halftone dot size, at the corresponding angles (for example, 15 degrees and 75 degrees).

In this way, when the halftone screening process is performed on the data D1c of the C component obtained by selecting and applying the screen CSc to the input image data D1 (see FIG. 10) or when the halftone screening process is performed on the data D1m of the M component obtained by selecting and applying the screen MSc to the input image data D1, it is possible to form a halftone image [see M and C halftone patterns shown in FIG. 17A] having two dots as the minimum halftone dot size in the highlight region.

The dot size control unit 126 selects the screen KSc for data D1k of the K component in the image data D1.

The halftone screening unit 125 arranges the selected screen KSc on the data D1k of the K component, compares the pixel value at the position of each cell in the data D1k of the k component with the pixel value at the position of the corresponding cell on the screen KSc, generates K halftone image data D2k with a value "1" or "0" on the basis of the comparison result, and outputs the K halftone image data D2k.

As described above, the screen KSc is obtained by inclining the screen Sc1 (see FIG. 7) corresponding to the Y component, which has one dot as the minimum dot size, at an angle (for example, 45 degrees).

In this way, when the halftone screening process is performed on the data D1k of the K component obtained by selecting and applying the screen KSc to the input image data, it is possible to form a halftone image [see a K halftone pattern shown in FIG. 17A] having one pixel as the minimum halftone dot size in the highlight region.

As described above, the printer 10 according to this embodiment has the screen KSc corresponding to the K component in which the minimum halftone dot size in the highlight region is one pixel, the screen CSc corresponding to the C component in which the minimum halftone dot size in the highlight region is two pixels, the screen MSc corresponding to the M component, and the screen YSc corresponding to the Y component in which the minimum halftone dot size in the highlight region is four pixels. The dot size control unit 126 selects the screen KSc for the raster image data of the K component, and the halftone screening unit 125 converts the raster image data into black halftone image data having one pixel as the minimum halftone dot size using the screen KSc.

The dot size control unit 126 selects the screens CSc and MSc for the raster image data of the C and M components, respectively, and the halftone screening unit 125 converts the raster image data into magenta and cyan halftone image data having two pixels as the minimum halftone dot size using the screens MSc and CSc, respectively.

The dot size control unit 126 selects the screen YSc for the raster image data of the Y component, and the halftone screening unit 125 converts the raster image data into Y halftone image data having four dots as the minimum halftone dot size using the screen YSc.

Figure 17B:
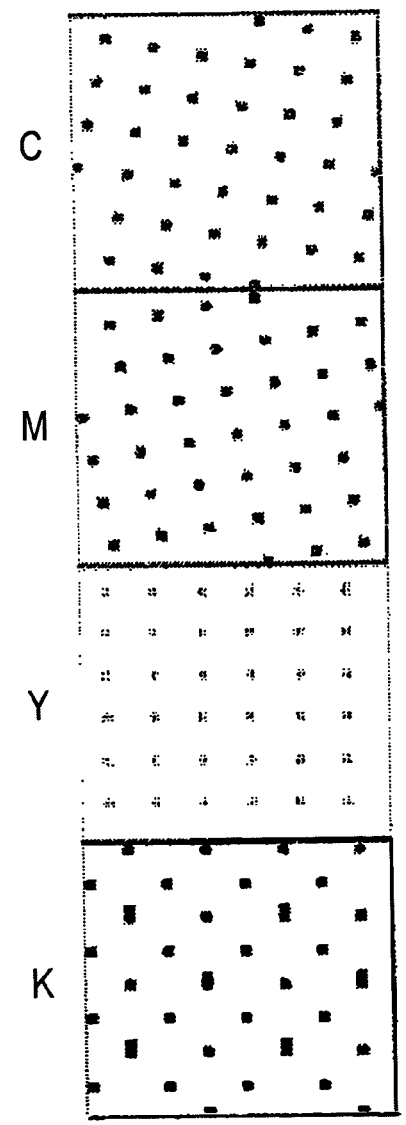

FIGS. 17A and 17B are conceptual diagrams illustrating an example of the halftone pattern (dot arrangement pattern) in the highlight portion formed by the halftone image processing of the printer 10 according to this embodiment and the pattern according to the related art.

FIG. 17A is a diagram illustrating the halftone pattern according to this embodiment, and shows the arrangement of halftone dots when the regions with the same density in the C, M, Y, and K components, which are arranged from the upper side in this order, are converted into halftone images.

FIG. 17B is a diagram illustrating a comparative example of the halftone pattern according to this embodiment, and shows an example of the halftone pattern (dot arrangement pattern) of each color component used in the apparatus according to the related art.

In the halftone pattern [see FIG. 17B], each of the C, M, Y, and K components is converted into a dot image having one pixel as the minimum halftone dot size (however, the screen angles are different from each other).

In contrast, in the halftone pattern according to this embodiment, the minimum halftone dot size is one pixel for the K component with a high flash absorption ratio, similar to the related art, the minimum halftone dot size is two pixels for each of the M and C components, and the minimum halftone dot size is four dots for the Y component.

As described above, in the flash fixing process of the flash fixing unit (flash fixing unit 44), as the minimum halftone dot size is reduced, the amount of heat diffused to the surrounding sheet is increased as compared to an increase in the temperature of the toner. The thermal diffusion is large in the M or C component with a low flash absorption ratio and the Y component with a low flash absorption ratio.

In this embodiment, the minimum halftone dot size of the M or C component with a low flash absorption ratio is two times greater than that of the K component and the minimum halftone dot size of the Y component with a low flash absorption ratio is four times greater than that of the K component, in consideration of the above. According to this structure, it is possible to reduce a temperature increase due to the flash absorption of each of the M, C, and Y components and the diffusion of heat to the surrounding sheet, thereby ensuring the fixing temperature. As a result, it is possible to stabilize the fixing operation.

Figure 18:
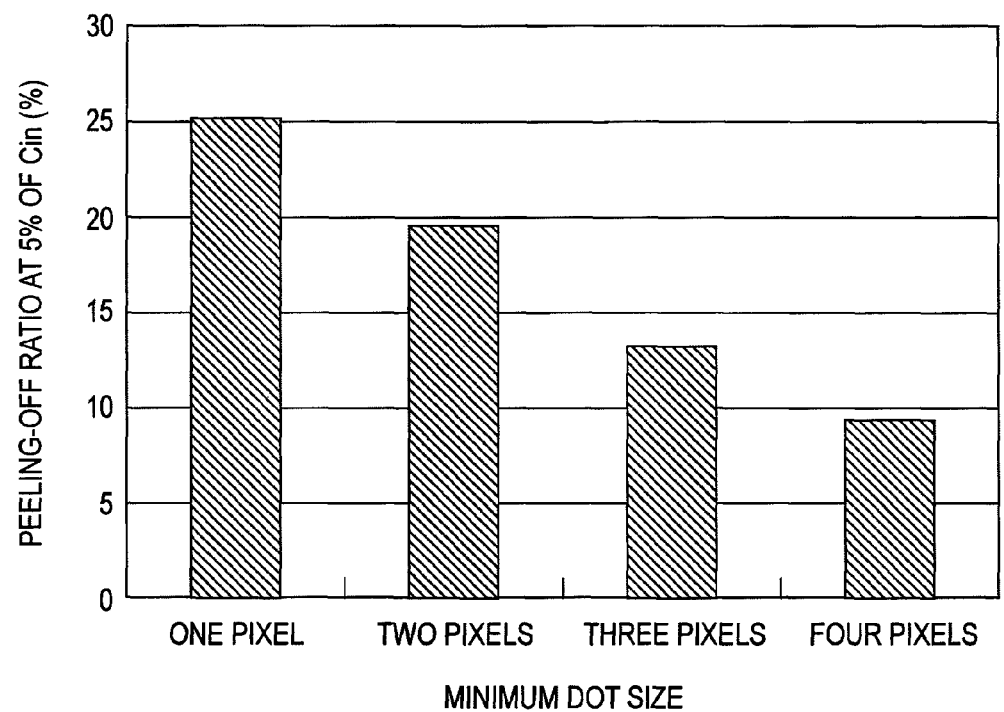
FIG. 18 is a diagram illustrating the measurement results of a toner peeling-off ratio when the halftone pattern according to the first embodiment is used.

FIG. 18 is a characteristic diagram illustrating an example of the measurement result of a toner peeling-off ratio in a friction experiment that is performed at 5% of area coverage ratio when halftone patterns with different minimum halftone dot sizes are used for an M toner in the halftone image processing of the printer 10 according to this embodiment.

As can be seen from the characteristic diagram shown in FIG. 18, in this embodiment, when the minimum halftone dot size is one pixel, the peeling-off ratio is 25%. However, as the minimum halftone dot size is increased in the order of two pixels, three pixels, and four pixels using the halftone patterns with different minimum halftone dot sizes in the M toner, the peeling-off ratio is reduced in the order of 20%, 15%, and 10%.

Similar to the M component, when the minimum halftone dot size is two pixels for the C component, it is possible to reduce the amount of heat diffused to the surrounding sheet and improve the efficiency of the fixing operation (reduce the peeling-off ratio). For the Y component, for example, when the minimum halftone dot size is four pixels, it is possible to improve the efficiency of the fixing operation (reduce the peeling-off ratio).

In this embodiment, when the minimum halftone dot size of the M, C, or Y component is increased, the intervals between neighboring halftone dots in the highlight portion is increased.

Figure 19A:
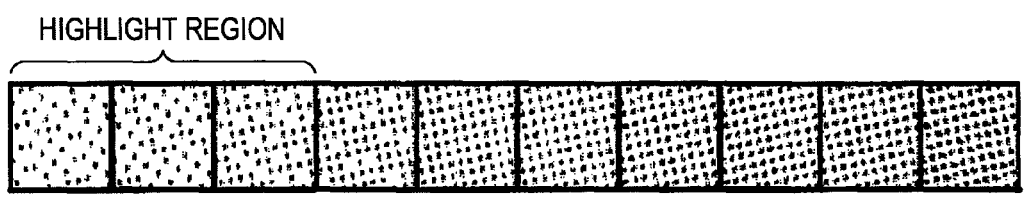
FIGS. 19A and 19B are conceptual diagrams illustrating the random arrangement of dots in an M halftone pattern according to the first embodiment and the random arrangement of dots in a pattern according to the related art.
Figure 19B:
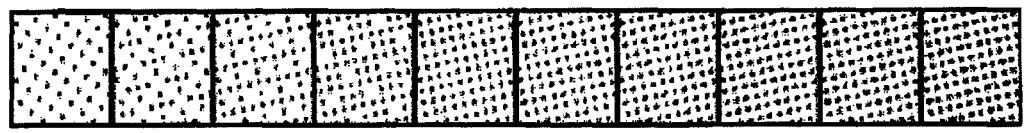

In a process of increasing the halftone dot intervals, if the intervals are uniformly increased [see FIG. 17A], the Y component halftone dots are hardly seen by the human eye in terms of the spatial frequency characteristics of the human eye, but the graininess of the C and M component halftone dots are perceptible to the eye due to the periodicity of a frequency lower than the halftone dot intervals according to the related art [see FIG. 19B].

In order to improve the above-mentioned thing, the following method is considered in which, when the minimum halftone dot size is large, a halftone screen in which the halftone dot intervals are not uniformly increased but halftone dots are arranged relatively at random is prepared and halftone screening is performed by using the screen.

The random dot arrangement means the arrangement with blue noise spectral characteristics.

As a modification of this embodiment, the following structure is considered in which screens that have the blue noise spectral characteristics and relatively random dot arrangement (halftone dots are arranged at random in a region with a area coverage ratio lower than a predetermined value) are prepared so as to correspond to, for example, the M and C components, and the dot size control unit 126 performs the halftone screening process on the image data (the halftone image data of a color component that increases the minimum halftone dot size) of each of the M and C components in the input image data using the screens.

FIG. 19A is a conceptual diagram illustrating the arrangement of halftone dots in an M halftone pattern according to a modification of this embodiment.

In FIGS. 19A and 19B, as a comparative example of the arrangement of dots in the M halftone pattern shown in FIG. 19A, an example of the arrangement of dots in the M halftone pattern used in this type of apparatus according to the related art is shown.

FIG. 19B shows the existing halftone pattern in which the halftone dots are uniformly arranged and the minimum halftone dot size is one pixel. However, in a modification of this embodiment, as shown in FIG. 19A, the minimum halftone dot size is two pixels in a low area coverage region of the M component and the halftone dots are arranged at random, that is, the dots with the blue noise spectral characteristics are arranged. Therefore, even when the minimum halftone dot size of the M component is two pixels, it is difficult for the human eye to perceive the graininess of the M component halftone dots.

As described above, this embodiment has a halftone image processing function (dot size control unit 126) that uses different screens corresponding to each color component to make the minimum halftone dot size of a color component with a low flash absorption ratio greater than the minimum halftone dot size of a color component with a high flash absorption ratio. When color toners with different flash absorption ratios are used to form a color image, it is possible to improve the balance between the flash light fixing properties of the color toner images transferred onto the sheet.

As described in the first embodiment, in the characteristic diagram of FIG. 3, when the general xenon lamp 441 with the emission spectrum denoted by symbol Sf1 emits flash light to fix the Y, M, C, and Y toners with the spectral reflectivities denoted by symbols Ry, Rm, Rc, and Ry, the color toners have the flash absorption ratios shown in FIG. 4.

As such, in the first embodiment, for the color toners with the flash absorption ratios satisfying K>M and C>Y, for example, the minimum halftone dot sizes of the color components are controlled so as to satisfy Y>M and C>K when the halftone screening process is performed on the raster image data of each color component. In this way, it is possible to improve the fixing property of a color with a low flash absorption ratio.

However, in the second embodiment, in the characteristic diagram of FIG. 3, the M and C components have a common absorption spectrum region in the visible range (around 580 nm) in terms of controlling the emission of the xenon lamp 441 of the flash fixing unit 44 to increase the flash absorption ratio of toner (to improve the fixing property).

That is, in this embodiment, the flash fixing unit 44 drives the xenon lamp to emit light such that it has emission intensity in an absorption spectrum region common to the visible ranges of the M and C toners.

Figure 20:
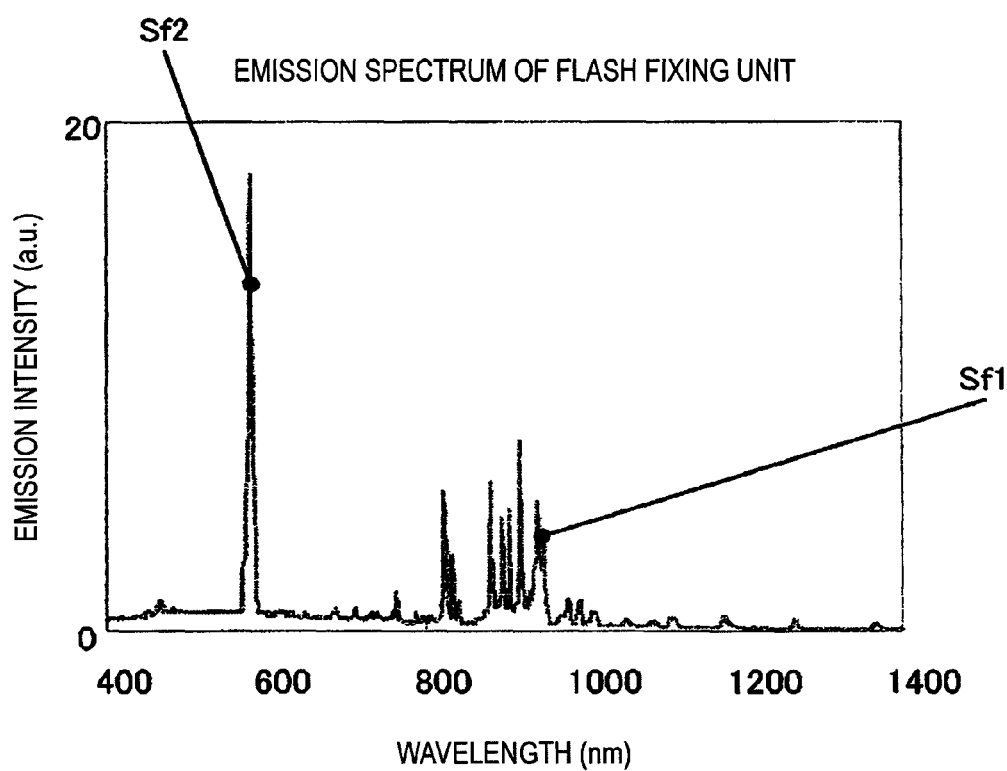
FIG. 20 is a diagram illustrating emission simulation data of a xenon lamp according to a second embodiment.

FIG. 20 is a diagram illustrating emission simulation data (emission spectrum characteristics indicating emission intensity with respect to an emission wavelength) when the xenon lamp 441 is driven to emit light. As shown in FIG. 20, a bright line spectrum is generated such that the flash fixing unit has emission intensity in the common absorption spectrum region (around 580 nm: Sf2) of the M and C toners, in addition to a general emission spectrum of the xenon lamp 441 (see "Sf1" of FIG. 3).

Figure 21:
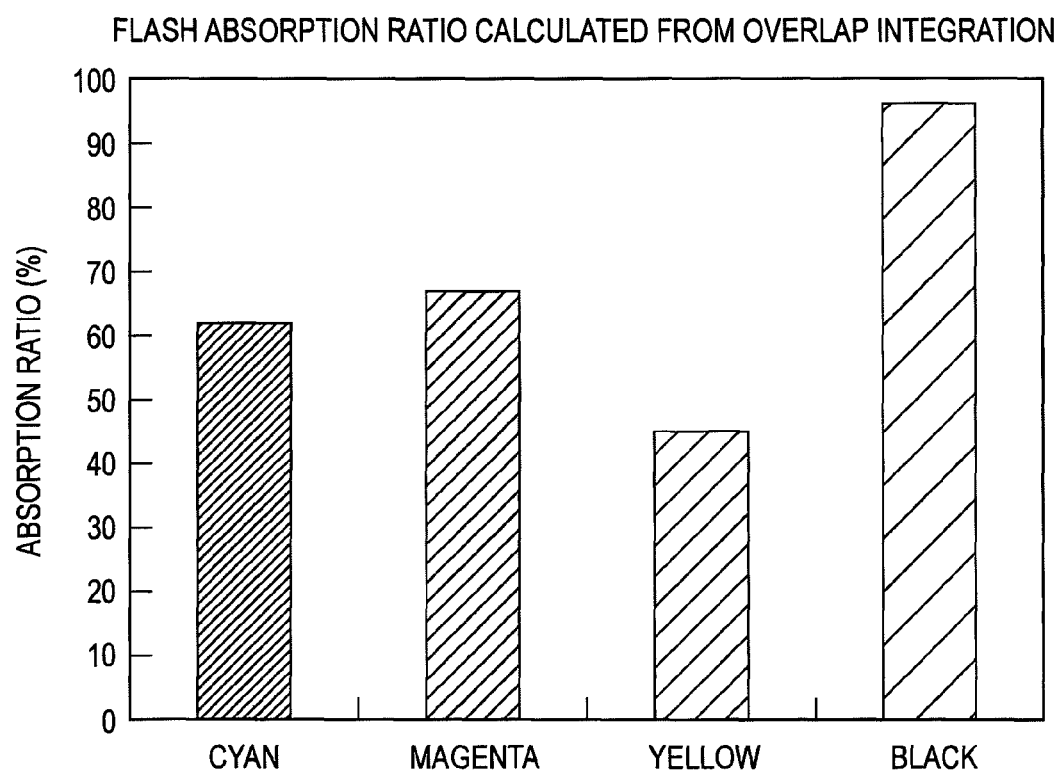
FIG. 21 is a diagram illustrating the light absorption ratio characteristics of each color toner when light is emitted in the emission spectrum shown in FIG. 20.

The results shown in FIG. 21 are obtained by calculating the light absorption ratio of each color toner from the emission simulation data and the spectral reflectivities of the Y, M, C, and K toners shown in FIG. 3.

That is, FIG. 21 shows the results obtained by performing overlap integration on the flash absorption ratio of each color toner when the xenon lamp of the flash fixing unit 44 is driven to emit light such that the emission spectrum characteristics shown in FIG. 20 are obtained. The light absorption ratios satisfy K>M≈C>Y.

In this case, the flash absorption ratio of each of the M and C toners is higher than that when the xenon lamp 441 is driven to emit light with the emission spectrum Sf1 shown in FIG. 3 (see FIG. 4). The following idea is conceived in consideration of the above, in order to improve the balance between the fixing properties of the color toners.

That is, in this embodiment, the flash absorption ratio of the Y component with low contrast is intentionally reduced, and the flash absorption ratios of other color components (M and C components) are increased to improve the fixing properties of the M and C toners. Then, the minimum halftone dot size of the Y component with a low flash absorption ratio is increased (size control is performed such that the dot size of the K component is not reduced). In this way, the fixing properties of the toner are ensured.

Figure 22:
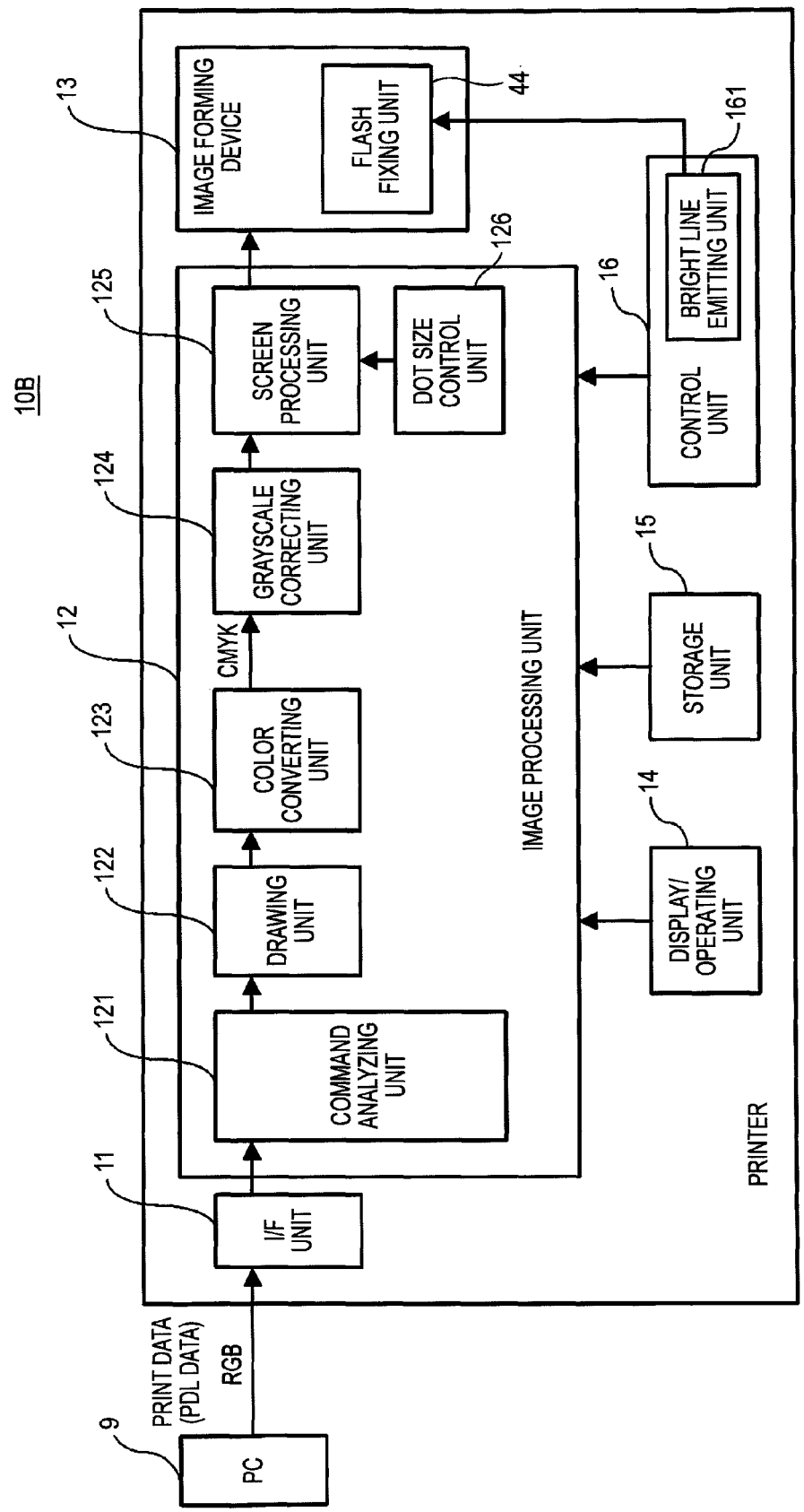
FIG. 22 is a block diagram illustrating the functional structure of a printer according to the second embodiment.

FIG. 22 is a block diagram illustrating the functional structure of a printer 10B according to the second embodiment. In the printer 10B, the same components as those in the printer 10 according to the first embodiment are denoted by the same reference numerals.

As shown in FIG. 22, the printer 10B according to this embodiment includes a control unit 16b provided with a bright line emitting unit 161b.

The bright line emitting unit 161b has a control function of driving the xenon lamp 441, which is a light source, of the flash fixing unit 44 to emit light with the emission spectrum characteristics in which, for example, the bright line spectrum Sf2 is generated in an absorption spectrum region (around 580 nm) common to the M and C toners, as shown in FIG. 20.

A halftone screening unit 125b, serving as a halftone image processing function unit, has first, second, third, and fourth screens (corresponding to first, second, third, and fourth tables in FIG. 23) corresponding to the K, M, C, and Y components. Among the first to fourth screens, at least the fourth screen corresponding to the Y component in which the minimum halftone dot size of the Y component is greater than those of the other color components is prepared. A dot size control unit 126b has a function of selecting the first, second, third, and fourth screens for the image data of the K, M, C, and Y components and controlling the minimum halftone dot size such that the minimum halftone dot size of at least the Y component is greater than those of the other color components.

Figure 23:
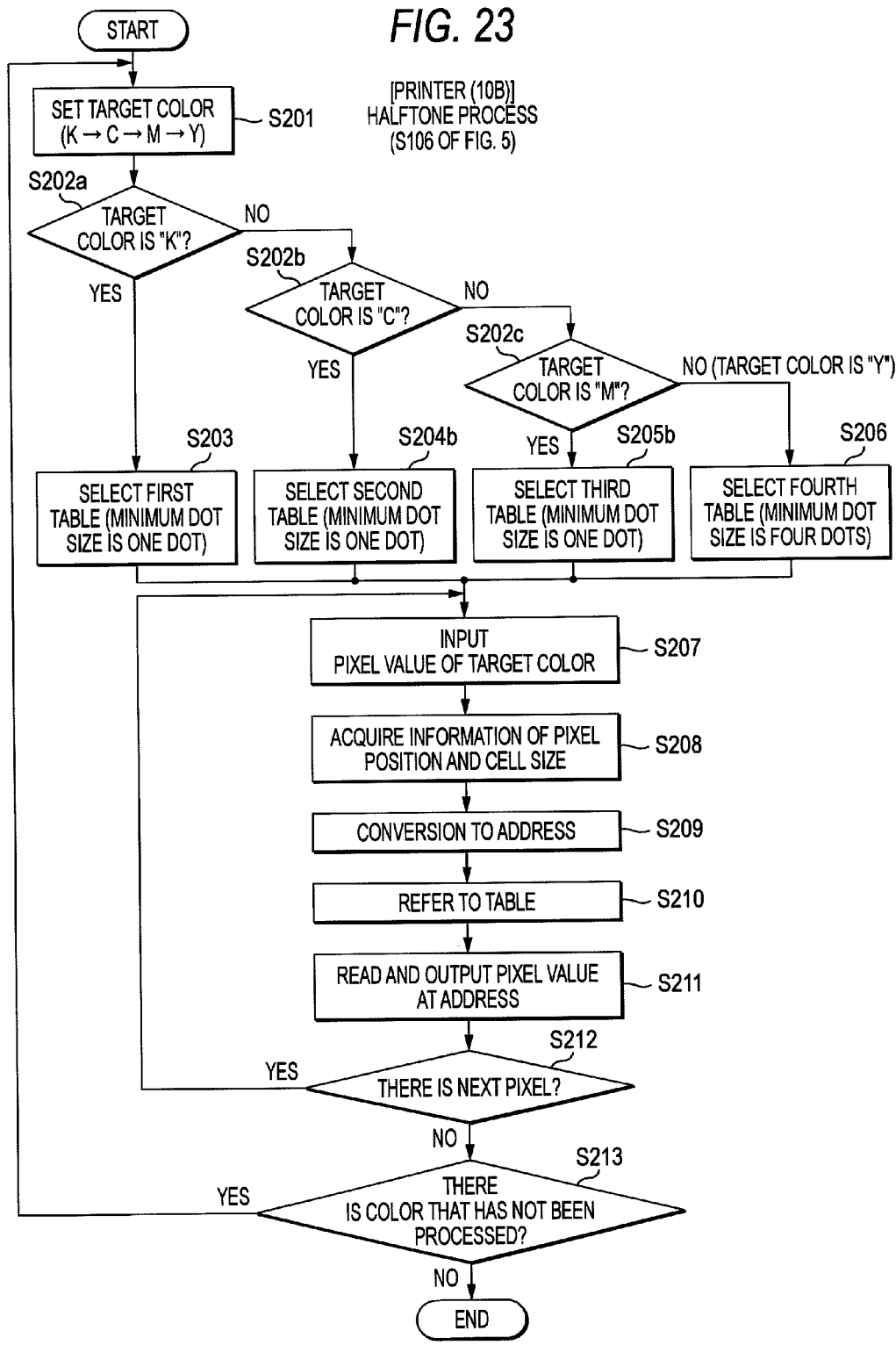
FIG. 23 is a flowchart illustrating a halftone image processing operation of the printer according to the second embodiment.

FIG. 23 is a flowchart illustrating the halftone screening process (Step S106 in FIG. 5) of the printer 10B according to this embodiment.

In FIG. 23, the same steps as those in the halftone screening process (see FIG. 6) according to the first embodiment are denoted by the same reference numerals.

In FIG. 23, only Steps S204b and S205b are different from the corresponding Steps S204b and S205b in the first embodiment (FIG. 6).

This is because the second and third screens used in this embodiment differ from the second and third screens in the first embodiment.

That is, in the printer 10B according to this embodiment, the same screen KSc (the screen in which the minimum halftone dot image of the K component is one pixel) as that in the first embodiment is used as the first screen (corresponding to the first table in FIG. 23) corresponding to the K component. Similarly, the same screen YSc (see FIG. 9: the screen in which the minimum halftone dot image of the Y component is four pixels) as that in the first embodiment is used as the fourth screen (corresponding to the fourth table in FIG. 23) corresponding to the Y component.

On the other hand, as in the first embodiment, the screens in which the minimum halftone dot image of each of the C and M components is one pixel, not the screens CSc and MSc in which the minimum halftone dot image of each of the C and M components is two pixels, are used as the second screen (corresponding to the second table in FIG. 23) corresponding to the C component and the third screen (corresponding to the third table in FIG. 23) corresponding to the M component.

Therefore, similar to the first screen corresponding to the K component, screens that are inclined at the corresponding angles (for example, 15 degrees and 75 degrees) with respect to the screen Sc1 (the screen angle is, for example, 0 degree) corresponding to the Y component shown in FIG. 7 may be used as the second screen corresponding to the C component and the third screen corresponding to the M component.

In the printer 10B according to this embodiment in which the first, second, third, and fourth tables respectively corresponding to the first, second, third, and fourth screens are prepared in, for example, the halftone screening unit 125b, the halftone screening unit 125b performs a halftone screening process shown in FIG. 23 on the data of each color component using the first, second, third, and fourth tables that are selected by the dot size control unit 126b according to each color component of the input image data.

In FIG. 23, when the raster image data to be subjected to the halftone screening process is input from the grayscale correcting unit 124, the halftone screening unit 125b sets "K", which is an initial color, as a halftone screening process target (Step S201) and determines whether a target color is K, M, or C (Steps S202a, S202b, and S202c).

Then, if it is determined that the target color is "K" (Step S202a: YES), the dot size control unit 126b selects the first table corresponding to "K" which has been prepared in advance (Step S203), and the halftone screening unit 125b performs the halftone screening process (a process of converting each input pixel value of the K component into a binary output pixel value using the first table) on the input image data of the K component using the first table in Steps S207 to S212.

When the halftone screening process on the target color "K" is completed (Step S212: NO), the halftone screening unit 125b recognizes that there is a color "C" that has not been processed (Step S213: YES) and sets the color "C" as a target color (Step S201).

Then, if it is determined that the target color is "C" (Step S202b: YES), the dot size control unit 126b selects the second table corresponding to "C" (Step S204b), and the halftone screening unit 125b performs the halftone screening process (a process of converting each input pixel value of the C component into a binary output pixel value using the second table) on the input image data of the C component using the second table in Steps S207 to S212.

When the halftone screening process on the target color "C" is completed (Step S212: NO), the halftone screening unit 125b recognizes that there is a color "M" that has not been processed (Step S213: YES) and sets the color "M" as a target color (Step S201).

Then, if it is determined that the target color is "M" (Step S202c: YES), the dot size control unit 126b selects the third table corresponding to "M" (Step S205b), and the halftone screening unit 125b performs the halftone screening process (a process of converting each input pixel value of the M component into a binary output pixel value using the third table) on the input image data of the M component using the third table in Steps S207 to S212.

When the halftone screening process on the target color "M" is completed (Step S212: NO), the halftone screening unit 125b recognizes that there is a color "Y" that has not been processed (Step S213: YES) and sets the color "Y" as a target color (Step S201).

Then, if it is determined that the target color is "Y" (Step S202c: NO), the dot size control unit 126b selects the fourth table (Step S206), and the halftone screening unit 125b performs the halftone screening process (a process of converting each input pixel value of the Y component into a binary output pixel value using the fourth table) on the input image data of the Y component using the fourth table in Steps S207 to S212.

When the halftone screening process on the target color "Y" is completed (Step S212: NO), the halftone screening unit 125b recognizes that there is no color that has not been processed (Step S213: YES) and ends a series of halftone screening processes.

According to the printer 10B of this embodiment having the halftone screening process function shown in FIG. 23, for example, during the input of the image data D1 with the pixel values shown in FIG. 10, when the halftone screening process is performed on the input image data of each of the K, M, and C components, it is possible to form halftone images of the K, M, and C components having one pixel as the minimum halftone dot size in the highlight region [see FIG. 12: however, the halftone images have screen angles different from that of the Y component shown in FIG. 12 (in this embodiment, the K component has a screen angle of 45 degrees, the M component has a screen angle of 75 degrees, and the C component has a screen angle of 15 degrees)] using the first, second, and third screens implemented by the first, second, and third tables.

Similarly, during the input of the image data D1, when the halftone screening process is performed on the input image data of the Y component using the fourth screen (YSc: see FIG. 9) implemented by the fourth table, it is possible to form a halftone image having four dots as the minimum halftone dot size in the highlight region, for example, as shown in FIG. 16.

In the halftone screening process shown in FIG. 23, the raster image data of each of the K, C, and M components is converted into halftone image data of each of the K, C, and M components having one pixel as the minimum halftone dot size on the basis of the first, second, and third screens, and the raster image data of the Y component is converted into halftone image data of the Y component having four pixels as the minimum halftone dot size on the basis of the fourth screen (YSc: see FIG. 9). In this way, the minimum halftone dot sizes is controlled such that K, M, C>Y is satisfied. As a modification, the minimum halftone dot size may be controlled such that K>M≈C>Y are satisfied.

For the structure of the modification, for example, the first screen corresponding to the K component having one pixel as the minimum halftone dot size in the highlight region, the second screen corresponding to the C component having two pixels as the minimum halftone dot size in the highlight region, the third screen corresponding to the M component having two pixels as the minimum halftone dot size in the highlight region, and the fourth screen corresponding to the Y component having four pixels as the minimum halftone dot size in the highlight region may be prepared. The dot size control unit 126b may select the first screen for the raster image data of the K component, the second screen for the raster image data of the C component, the third screen for the raster image data of the M component, and the fourth screen for the raster image data of the Y component. The halftone screening unit 125b may generate K halftone image data having one pixel as the minimum size using the first screen, C halftone image data having two pixels as the minimum size using the second screen, M halftone image data having two pixels as the minimum size using the third screen, and Y halftone image data having four pixels as the minimum size using the fourth screen.

For example, the halftone screening process performed by the halftone screening unit 125b and the dot size control unit 126b according to this modification may be performed along the same flowchart as that shown in FIG. 6.

As can be seen from the content of the halftone screening process shown in FIG. 23, in this embodiment, the flash absorption ratios of the M and C components are increased by selecting the emission conditions of the xenon lamp 441 of the flash fixing unit 44, and the minimum halftone dot size on the screen corresponding to the Y component is regulated under the conditions for improving the fixing property without changing the minimum halftone dot size on the screen corresponding to each color.

In general, as density is reduced, halftone dot size is reduced. The size of the halftone dot is regulated in a given density region such that the density of the region in which the dots are thinned out is reduced.

Figure 24A:
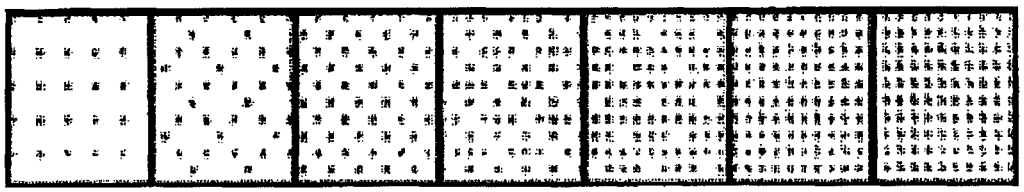
FIGS. 24A and 24B are conceptual diagrams illustrating a Y screen growth pattern according to the second embodiment and a pattern according to the related art.
Figure 24B:
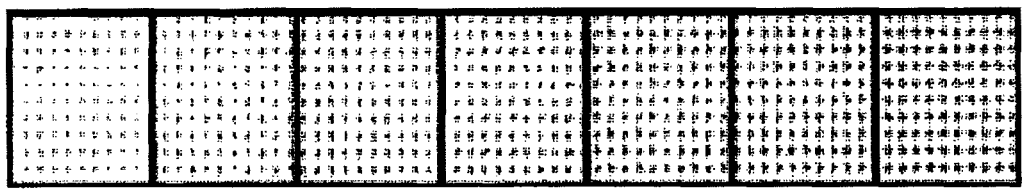

FIGS. 24A and 24B are conceptual diagrams illustrating the comparison between a screen growth pattern [FIG. 24A] by the Y screen according to this embodiment and a screen growth pattern [FIG. 24B] by a general Y screen.

In the Y screen growth pattern according to this embodiment shown in FIG. 24A, the minimum halftone dot size is regulated in a highlight region (for example, the minimum halftone dot size is maintained at four pixels). On the other hand, in the Y screen growth pattern according to the related art shown in FIG. 24B, the minimum halftone dot size is not regulated, unlike this embodiment, but in a lower density region, the minimum halftone dot size is reduced to one pixel.

In FIGS. 24A and 24B, the Y screen growth pattern [FIG. 24A] according to this embodiment is similar to the general Y screen growth pattern [FIG. 24B] in the number of pixels per unit area, but the Y screen growth pattern according to this embodiment differs from the general Y screen growth pattern in the structure of halftone dots.

When the minimum halftone dot size is regulated large, the frequency of the halftone screen is reduced, and the graininess of an image is generally perceptible especially in a highlight region, which results in a low image quality. On the other hand, as the contrast of brightness of Y component image is lower than one of the other color components, the graininess of Y component image is difficult to be perceived even if the frequency of the halftone screen is low.

When the screen growth pattern according to this embodiment that is similar to the general screen growth pattern in the ratio of area coverage but is different from the general screen growth pattern in the dot structure is used for the Y component image, the density of the Y component is constant in a macro view and printing quality is maintained because of the difficulty in perceiving the graininess.

As described above, in this embodiment, the flash absorption ratio of the Y component is intentionally reduced, and the flash absorption ratios of other color components (M and C components) are increased. In this way, the fixing properties of the M and C toners are improved, and the halftone dot size of the Y component with a low flash absorption ratio is increased. As a result, the fixing properties of the toner are ensured, and a reduction in image quality is prevented.

The invention is not limited to the above-described embodiments shown in the drawings, but various modifications and changes of the invention can be made without departing from the scope and spirit of the invention.

For example, in the second embodiment, similar to the first embodiment, a screen (with blue noise characteristics) on which dots are arranged at random in the highlight region in which the area coverage ratio is less than a predetermined value may be used as the screen corresponding to the Y component that regulates the minimum halftone dot size.

In each of the above-described embodiments, an image processing program executed by a computer is installed in an image forming apparatus, such as a printer, and the program allows the computer to function as: a raster image data generating unit (for example, the drawing unit 122 and the color space converting unit 123) that generates raster image data of each color component from PDL data to be printed; a halftone image data generating unit (halftone screening unit 125) that converts multi-grayscale pixels in the raster image data to binary pixels to generate halftone image data of each color component from the raster image data; and a size control unit (dot size control unit 126) that controls the minimum halftone dot size to a size corresponding to each color component when the halftone image data generating unit generates the halftone image data. The image forming program may be stored in, for example, a CD-ROM and then provided.

The invention can be applied to color image forming apparatuses, such as various kinds of printers or multi-function printers that fix each color toner image transferred onto a sheet as a color image with flash light emitted from a flash fixing unit, and an image processing program installed in the color image forming apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a raster image data generating unit that generates raster image data of a plurality of color components from document data to be printed;

a halftone image data generating unit that generates halftone image data from the raster image data of the plurality of color components;

a size control unit that controls minimum halftone dot sizes of the halftone image data corresponding to the plurality of color components when the halftone image data generating unit generates the halftone image data, the minimum halftone dot sizes being numbers of pixels of the plurality of color components corresponding to tight absorption ratios of the color components;

an image forming unit that forms color toner images to be fixed on a recording medium using color toners corresponding to the plurality of color components, based on the halftone image data whose minimum halftone dot sizes are controlled by the size control unit; and a flash fixing unit that emits flash light from a flash light source to the recording medium to fix the color toner images onto the recording medium.

2. The image forming apparatus according to claim 1, wherein the size control unit controls such that a minimum halftone dot size of a color component with a low light absorption ratio of toner with respect to the flash light is greater than a minimum halftone dot size of another color component with a high light absorption ratio.

3. The image forming apparatus according to claim 1, wherein the plurality of color components indicates black, magenta, cyan, and yellow components, and the size control unit controls a minimum halftone dot size of the yellow component to be greater than minimum halftone dot sizes of the other color components which are black, magenta and cyan components.

4. The image forming apparatus according to claim 1, further comprising:
an emission control unit that controls the flash light source of the flash fixing unit to emit the flash light such that, when a group of color components among the plurality of color components has a common flash absorption spectrum region in a visible range, an emission spectrum includes a bright line spectrum corresponding to the common flash absorption spectrum region,
wherein the size control unit controls the minimum halftone dot sizes such that a minimum halftone dot size of a color components other than the color component group is greater than the minimum halftone dot sizes of the color component group.

5. The image forming apparatus according to claim 1, wherein the size control unit uses a halftone screen on which halftone dots are arranged at random in a region in which an area coverage ratio is less than a predetermined value when one of the halftone image data of the color components whose minimum halftone dot size is increased is generated.

6. An image forming method for forming an image by an image forming apparatus, the method comprising:
generating raster image data of a plurality of color components from document data to be printed;
generating halftone image data from the raster image data of the plurality of color components; and
controlling minimum halftone dot sizes of the halftone image data corresponding to the plurality of color components when the halftone image data are generated, the minimum halftone dot sizes being numbers of pixels of the plurality of color components corresponding to light absorption ratios of the color components,
wherein the image forming apparatus comprises:
an image forming unit forms color toner images to be fixed on a recording medium using color toners corresponding to the plurality of color components, based on the halftone image data whose minimum halftone dot sizes are controlled, and
a flash fixing unit emits flash light from a flash light source to the recording medium to fix the color toner images transferred onto the recording medium.

7. The image forming method according to claim 6, further comprising:
controlling the flash light source of the flash fixing unit to emit the flash light such that, when a group of color components among the plurality of color components has a common flash absorption spectrum region in a visible range, an emission spectrum includes a bright line spectrum corresponding to the common flash absorption spectrum region,
controlling the minimum halftone dot sizes such that a minimum halftone dot size of a color components other than the color component group is greater than the minimum halftone dot sizes of the color component group.

8. A on-transitory computer readable medium storing a program causing a computer to execute a process for forming an image by an image forming apparatus, the process comprising:
generating raster image data of a plurality of color components from document data to be printed;
generating halftone image data from the raster image data of the plurality of color components; and
controlling minimum dot sizes of the halftone image data corresponding to the plurality of color components when the halftone image data are generated, the minimum halftone dot sizes being numbers of pixels of the plurality of color components corresponding to light absorption ratios of the color components,
wherein the image forming apparatus comprises:
an image forming unit forms color toner images to be fixed on a recording medium using color toners corresponding to the plurality of color components, based on the halftone image data whose minimum halftone dot sizes are controlled, and
a flash fixing unit emits flash light from a flash light source to the recording medium to fix the color toner images transferred onto the recording medium.

9. The non-transitory computer readable medium according to claim 8, further comprising:
controlling the flash light source of the flash fixing unit to emit the flash light such that, when a group of color components among the plurality of color components has a common flash absorption spectrum region in a visible range, an emission spectrum includes a bright line spectrum corresponding to the common flash absorption spectrum region,
controlling the minimum halftone dot sizes such that a minimum halftone dot size of a color components other than the color component group is greater than the minimum halftone dot sizes of the color component group.

* * * * *